(12) United States Patent
Kojima

(10) Patent No.: US 10,449,856 B2
(45) Date of Patent: Oct. 22, 2019

(54) DRIVING ASSISTANCE APPARATUS AND DRIVING ASSISTANCE METHOD

(71) Applicant: Panasonic Intellectual Property Management Co., Ltd., Osaka (JP)

(72) Inventor: Yoshihiro Kojima, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 154 days.

(21) Appl. No.: 15/607,992

(22) Filed: May 30, 2017

(65) Prior Publication Data
US 2017/0368936 A1 Dec. 28, 2017

(30) Foreign Application Priority Data
Jun. 28, 2016 (JP) .................................. 2016-127972

(51) Int. Cl.
*G01C 22/00* (2006.01)
*G05D 1/00* (2006.01)
(Continued)

(52) U.S. Cl.
CPC .......... *B60K 28/06* (2013.01); *B60W 30/182* (2013.01); *B60W 40/06* (2013.01); *B60W 40/08* (2013.01); *B60W 40/09* (2013.01); *B60W 50/14* (2013.01); *G05D 1/0061* (2013.01); *B60K 2370/175* (2019.05); *B60K 2370/1868* (2019.05); *B60K 2370/193* (2019.05); *B60K 2370/566* (2019.05); *B60W 2040/0827* (2013.01); *B60W 2040/0872* (2013.01); *B60W 2050/0072* (2013.01); *B60W 2520/10* (2013.01); *B60W 2540/22* (2013.01);
(Continued)

(58) Field of Classification Search
None
See application file for complete search history.

(56) References Cited

U.S. PATENT DOCUMENTS 9,342,074 B2 * 5/2016 Dolgov ................. B60W 30/00
9,550,500 B2 * 1/2017 Hackenberg ........ B60W 50/082
(Continued)

FOREIGN PATENT DOCUMENTS

DE 102014011264 A1 1/2016
DE 102014225680 A1 6/2016
(Continued)

OTHER PUBLICATIONS

The Extended European Search Report dated Nov. 15, 2017 for the related European Patent Application No. 17173443.7.

*Primary Examiner* — Bhavesh V Amin
(74) *Attorney, Agent, or Firm* — Greenblum & Bernstein, P.L.C.

(57) ABSTRACT

Provided is a method for use by a driving assistance apparatus that assists a transition from an autonomous driving mode in which a vehicle is driven under autonomous control to a manual driving mode in which the vehicle is driven by a driver. The method includes: detecting an activity by the driver; detecting conditions of the driver; and determining a take-over request method which is a method of presenting, in the vehicle, a take-over request that informs the driver that the autonomous driving mode is going to be cancelled, the determining being based on at least the detected activity by the driver and the detected conditions.

14 Claims, 12 Drawing Sheets

(51) Int. Cl.
  *B60K 28/06* (2006.01)
  *B60W 30/182* (2012.01)
  *B60W 40/06* (2012.01)
  *B60W 40/09* (2012.01)
  *B60W 50/14* (2012.01)
  *B60W 40/08* (2012.01)
  *B60W 50/00* (2006.01)

(52) U.S. Cl.
  CPC ..... *B60W 2540/26* (2013.01); *B60W 2550/00* (2013.01); *B60W 2550/14* (2013.01); *B60W 2550/30* (2013.01); *B60W 2550/402* (2013.01); *G05D 2201/0213* (2013.01)

(56) References Cited

U.S. PATENT DOCUMENTS

| | | | |
|---|---|---|---|
| 9,694,681 B2 * | 7/2017 | Kleen | B60W 50/14 |
| 2004/0017106 A1 * | 1/2004 | Aizawa | B60T 7/12 303/191 |
| 2014/0303827 A1 * | 10/2014 | Dolgov | B60W 30/00 701/23 |
| 2015/0094899 A1 * | 4/2015 | Hackenberg | B60W 50/082 701/23 |
| 2015/0353088 A1 | 12/2015 | Ishikawa | |
| 2016/0214483 A1 * | 7/2016 | Kleen | B60W 50/14 |
| 2017/0032200 A1 | 2/2017 | Schmidt et al. | |
| 2017/0305440 A1 * | 10/2017 | Oba | B60W 50/082 |
| 2017/0368936 A1 * | 12/2017 | Kojima | B60K 28/06 |

FOREIGN PATENT DOCUMENTS

| | | |
|---|---|---|
| JP | 2015-210660 | 11/2015 |
| JP | 2015-230573 | 12/2015 |

\* cited by examiner

FIG. 3

| ACTIVITY | IN-VEHICLE CAMERA BODY MOVEMENT SENSOR | IN-VEHICLE CAMERA | | | MICROPHONE | | | VEHICLE-MOUNTED DEVICES I/F |
|---|---|---|---|---|---|---|---|---|
| | BODY MOTION | HELD OBJECT | VIEWED OBJECT | VOICE | NUMBER OF SPEAKERS | ENVIRONMENTAL SOUND | | |
| TEXTING, USING SNS, BROWSING WEB | TOUCH SCREEN PUSH BUTTON | SMARTPHONE | SMARTPHONE AUTOMOTIVE NAVIGATION SYSTEM | | | OPERATION SOUND | | SMARTPHONE AUTOMOTIVE NAVIGATION SYSTEM |
| PLAYING VIDEO GAME | TOUCH SCREEN PUSH BUTTON | SMARTPHONE GAMES CONSOLE | SMARTPHONE GAMES CONSOLE | | | VIDEO GAME SOUND EFFECT | | SMARTPHONE GAMES CONSOLE |
| WATCHING TV | | REMOTE CONTROL | CAR TV | | | TV AUDIO | | CAR TV |
| READING | TURN PAGE | BOOK | BOOK | | | PAGE TURNING SOUND | | |
| LISTENING TO MUSIC/RADIO | | | | | | MUSIC RADIO | | |
| CONVERSING | SPEAK (MOVE MOUTH) | | PASSENGER | YES | MORE THAN ONE | | | |
| TALKING ON THE PHONE | SPEAK (MOVE MOUTH) | | | YES | ONE | | | SMARTPHONE |
| HAVING MEAL | EAT (MOVE MOUTH/MOVE HAND TO MOUTH) | FOOD | FOOD | | | CHEWING SOUND | | |
| SHAVING | MOVE HAND NEAR FACE | SHAVER | MIRROR | | | SHAVER SOUND | | |

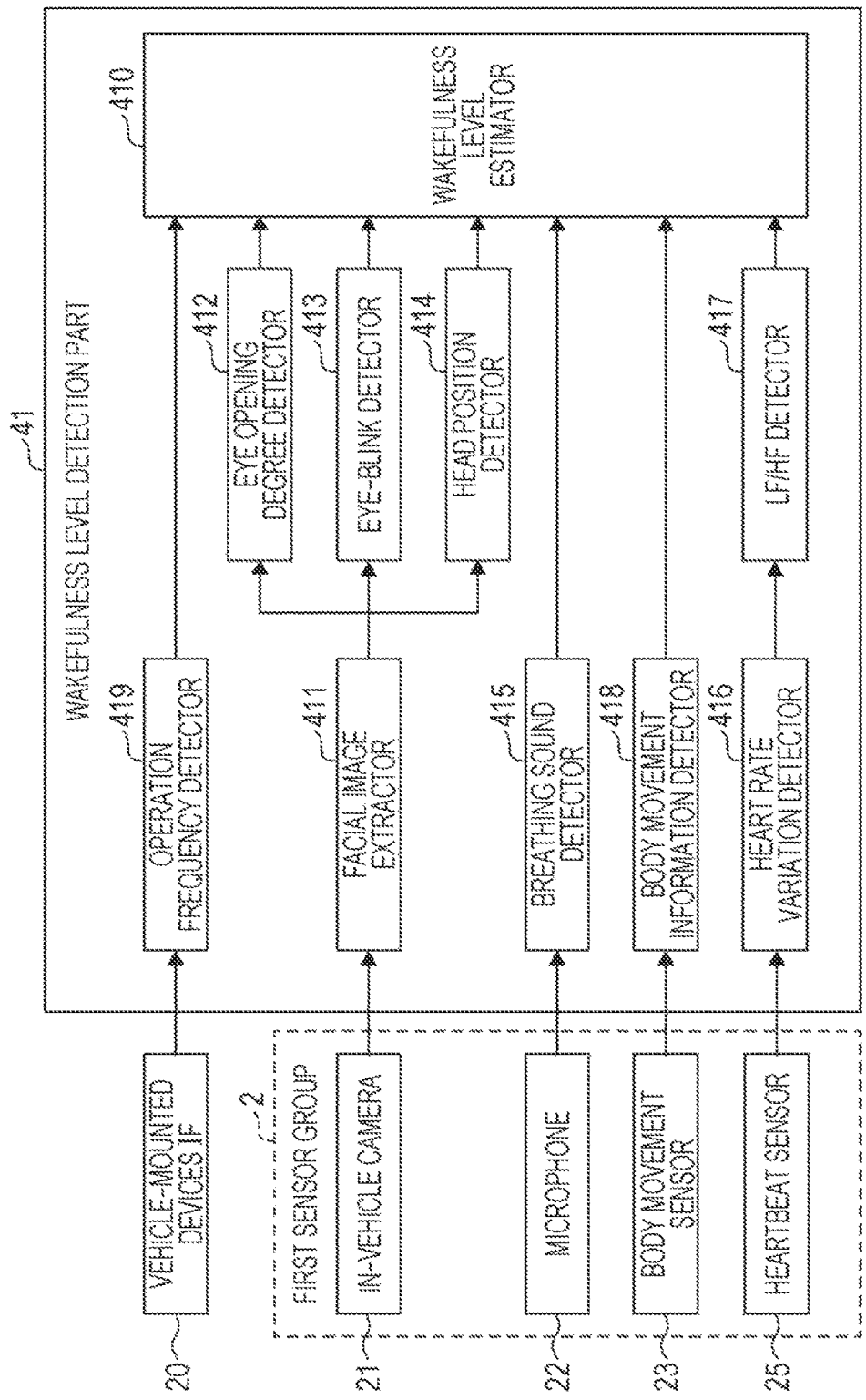

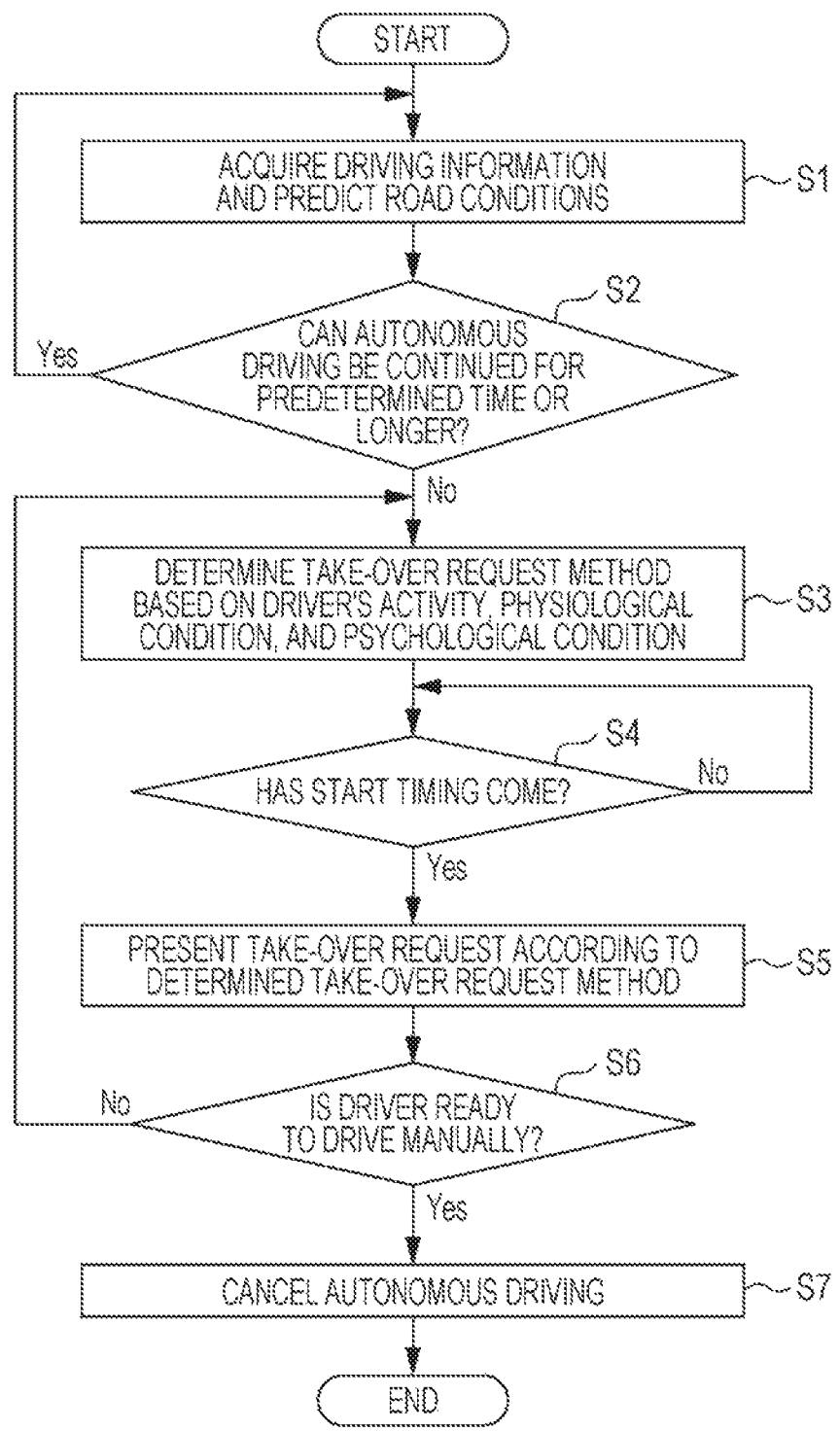

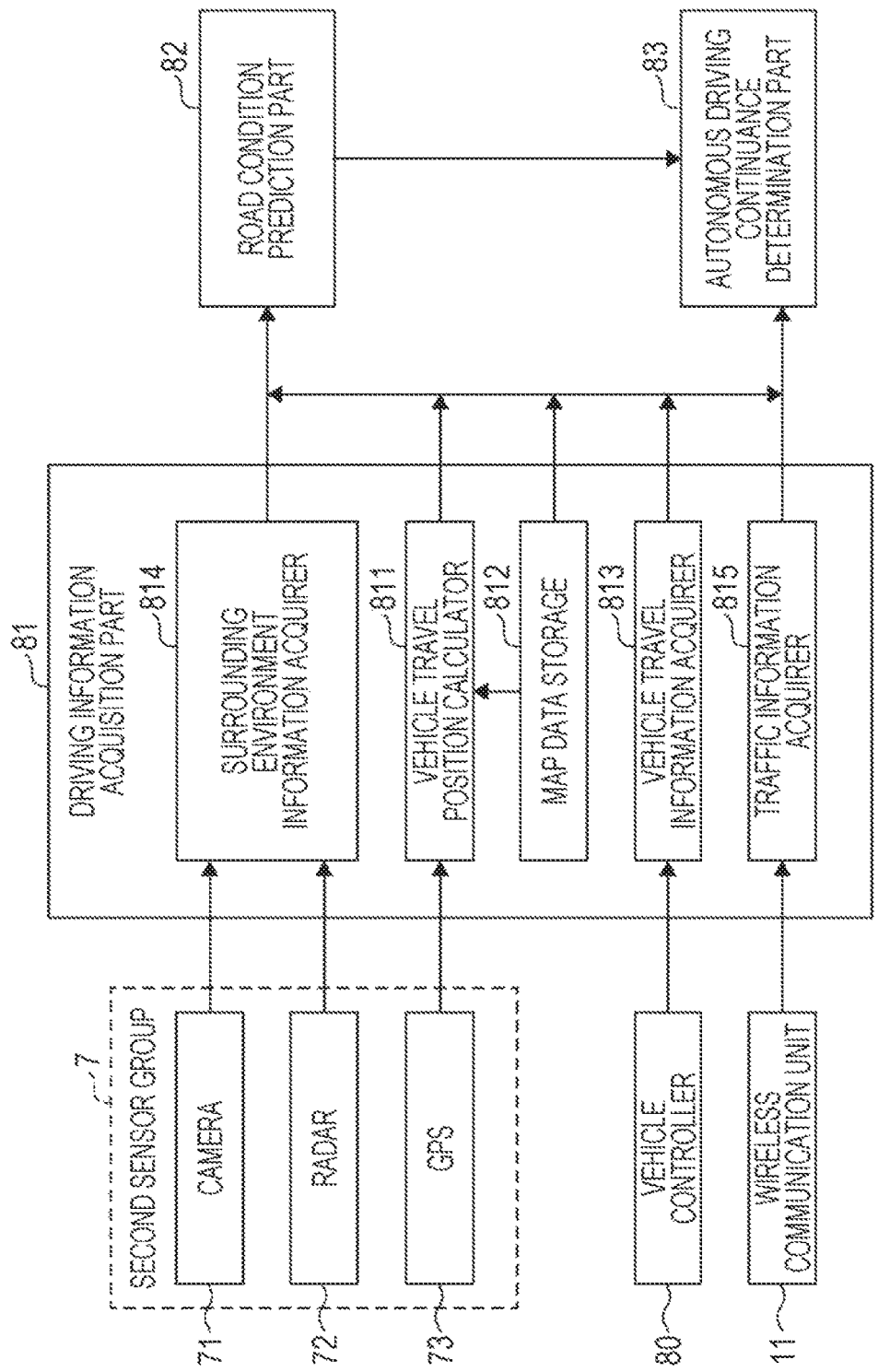

FIG. 10

| ACTIVITY | DRIVER'S CONDITIONS | | | | |
|---|---|---|---|---|---|
| | PHYSIOLOGICAL CONDITIONS | | | PSYCHOLOGICAL CONDITIONS | |
| | WAKEFULNESS LEVEL | FATIGUE LEVEL | | NERVOUSNESS LEVEL | ATTENTION LEVEL |
| TEXTING, USING SNS, BROWSING WEB | ○ | ○ | | ○ | ○ |
| PLAYING VIDEO GAME | ○ | ○ | | ○ | ○ |
| WATCHING TV | ○ | ○ | | ○ | ○ |
| READING | ○ | ○ | | ○ | ○ |
| LISTENING TO MUSIC/RADIO | ○ | ○ | | ○ | — |
| CONVERSING, TALKING ON THE PHONE | ○ | — | | ○ | — |
| HAVING MEAL | — | — | | ○ | ○ |
| BEING ENGAGED IN PERSONAL MAINTENANCE (SHAVING, PUTTING ON MAKEUP, etc.) | — | — | | ○ | ○ |

| DRIVER'S ACTIVITY | DRIVER'S CONDITIONS | | | | START TIMING | TAKE-OVER REQUEST METHOD | | |
|---|---|---|---|---|---|---|---|---|
| | PHYSIOLOGICAL CONDITIONS | | PSYCHOLOGICAL CONDITIONS | | | PRESENTATION DEVICE AND PRESENTATION CONTENT | | |
| | WAKEFULNESS LEVEL | FATIGUE LEVEL | NERVOUSNESS LEVEL | ATTENTION LEVEL | | DISPLAY | SPEAKER | ACTUATOR |
| TEXTING USING SNS BROWSING WEB PLAYING VIDEO GAME WATCHING TV | MEDIUM TO HIGH | LOW TO HIGH | MEDIUM TO HIGH | HIGH | ADVANCE | ON VIEWED SCREEN, DISPLAY WARNING PROMPTING TO STOP ACTIVITY | OUTPUT WARNING VOICE PROMPTING DRIVER TO STOP ACTIVITY | VIBRATE SEAT TO SHAKE BODY |
| | MEDIUM TO HIGH | LOW TO HIGH | HIGH | MEDIUM | ADVANCE | DISPLAY SCREEN PROMPTING DRIVER TO WAKE UP | OUTPUT WARNING VOICE OR ALARM PROMPTING DRIVER TO WAKE UP | VIBRATE SEAT TO SHAKE BODY EJECT COLD AIR FROM AIR CONDITIONER |
| | LOW (TO MEDIUM) | LOW TO HIGH | LOW TO MEDIUM | LOW | NORMAL | ON NAVIGATION SYSTEM SCREEN, DISPLAY NOTIFICATION OF SWITCH TO MANUAL DRIVING | OUTPUT VOICE GIVING NOTIFICATION OF SWITCH TO MANUAL DRIVING | — |
| | OTHER THAN ABOVE (SUCH AS ALL LEVELS ARE "MEDIUM") | | | | | | | |
| READING | MEDIUM TO HIGH | LOW TO HIGH | MEDIUM TO HIGH | HIGH | ADVANCE | ON NAVIGATION SYSTEM SCREEN, DISPLAY WARNING PROMPTING DRIVER TO STOP ACTIVITY | OUTPUT WARNING VOICE PROMPTING DRIVER TO STOP ACTIVITY | VIBRATE SEAT TO SHAKE BODY |
| | MEDIUM TO HIGH | LOW TO HIGH | HIGH | MEDIUM | ADVANCE | DISPLAY SCREEN PROMPTING DRIVER TO WAKE UP | OUTPUT WARNING VOICE OR ALARM PROMPTING DRIVER TO WAKE UP | VIBRATE SEAT TO SHAKE BODY EJECT COLD AIR FROM AIR CONDITIONER |
| | LOW | LOW TO HIGH | LOW TO MEDIUM | LOW | NORMAL | ON NAVIGATION SYSTEM SCREEN, DISPLAY NOTIFICATION OF SWITCH TO MANUAL DRIVING | OUTPUT VOICE GIVING NOTIFICATION OF SWITCH TO MANUAL DRIVING | — |
| | OTHER THAN ABOVE (SUCH AS ALL LEVELS ARE "MEDIUM") | | | | | | | |

D1

DRIVING ASSISTANCE APPARATUS AND DRIVING ASSISTANCE METHOD

BACKGROUND

1. Technical Field

The present disclosure relates to a driving assistance apparatus and a driving assistance method that assist a transition from an autonomous driving mode in which the vehicle is driven under autonomous control to a manual driving mode in which the vehicle is driven by a driver.

2. Description of the Related Art

Research and development of autonomous driving systems have been actively pursued in recent years. An autonomous driving system enables driving controls of a vehicle (such as accelerating, steering, and braking) to be performed automatically. For autonomous driving systems, widely used are autonomy levels which are defined from the viewpoint of the division of roles between the driver and the system. For example, according to the definition by the National Highway Traffic and Safety Administration in the United States Department of Transportation, there are five autonomy levels from Level 0 being manual driving to Level 4 being fully autonomous driving.

Currently-commercialized autonomous driving systems are of Levels 0 to 2 according to the above definition. Level 2 is an autonomy level at which the system controls more than one of the accelerating, steering, and braking, but the driver needs to constantly monitor the driving situation. It is expected that Level-3 autonomous driving systems will be commercialized in the near future. Level 3 is an autonomy level at which the driver does not need to monitor the driving situation while the system performs all of the accelerating, steering, and braking, but needs to be ready to take over the driving when the system reaches its functional limit.

The driver of a vehicle having a Level-3 autonomous driving system does not need to perform any driving task such as driving the vehicle or monitoring the driving situation, as long as the system is in stable operation. Nevertheless, the driver still needs to take over the driving task from the system when the system reaches its functional limit and switches the driving mode from the autonomous driving mode to the manual driving mode. However, it is likely that, when the driving mode is switched from the autonomous driving mode to the manual driving mode, the driver who has been disengaged from a driving task cannot immediately gain a sufficient situational awareness of the surrounding environment. Thus, from a driving safety perspective, a method for achieving an appropriate transition from autonomous driving by the system to manual driving by the driver is an important issue to be overcome in order for Level-3 autonomous driving systems to be commercialized. Various methods have been proposed to this end.

For example, Japanese Unexamined Patent Application Publication No. 2015-230573 (hereinafter referred to as Patent Document 1) discloses a vehicle driving assistance apparatus that predicts road conditions ahead of the host vehicle, determines based on the prediction whether autonomous driving will be continuable hereafter, and when determining that the autonomous driving will not be continuable, gives the driver an advance notice that the autonomous driving mode of the system is going to be cancelled. The vehicle driving assistance apparatus of Patent Document 1 gives the take-over request when the distance from the host vehicle to the predicted position at which the autonomous driving will be cancelled falls to or below a predetermined value. When the system gives such an advance notice of a transition from autonomous driving to manual driving, the driver can be prepared for manual driving beforehand, such as gaining a situational awareness of the surrounding environment, and make a safe transition to manual driving.

SUMMARY

One non-limiting and exemplary embodiment provides a driving assistance apparatus and a driving assistance method that help the driver return to manual driving in a transition from an autonomous driving mode in which the vehicle is driven under autonomous control to a manual driving mode in which the vehicle is driven by the driver.

In one general aspect, the techniques disclosed here feature a driving assistance apparatus that assists a transition from an autonomous driving mode in which a vehicle is driven under autonomous control to a manual driving mode in which the vehicle is driven by a driver. The driving assistance apparatus comprises one or more memories; and circuitry that, in operation, performs operations including detecting an activity by the driver, detecting a plurality of conditions of the driver, and determining a take-over request method which is a method of presenting, in the vehicle, a take-over request that informs the driver that the autonomous driving mode is going to be cancelled, the determining being based on at least the detected activity by the driver and the plurality of detected conditions.

The driving assistance apparatus and the driving assistance method according to the above aspect sets the take-over request method according to detection results of the driver's activity and conditions. This helps the driver return to manual driving in a transition from the autonomous driving mode in which the vehicle is driven under autonomous control to the manual driving mode in which the vehicle is driven by the driver.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 3 is a diagram illustrating operation of the activity detection section in the driving assistance apparatus;

FIG. 4 is a functional block diagram exemplifying functions of a wakefulness level detection part in the driving assistance apparatus;

FIG. 8 is a flowchart illustrating autonomous-driving-mode cancellation processing;

FIG. 9 is a functional block diagram exemplifying functions of a driving information acquisition part in the driving assistance apparatus;

FIG. 10 is a diagram illustrating an activities and conditions table in the driving assistance apparatus;

FIG. 11 is a diagram illustrating a cancellation warning methods database in the driving assistance apparatus;

Figure 1:
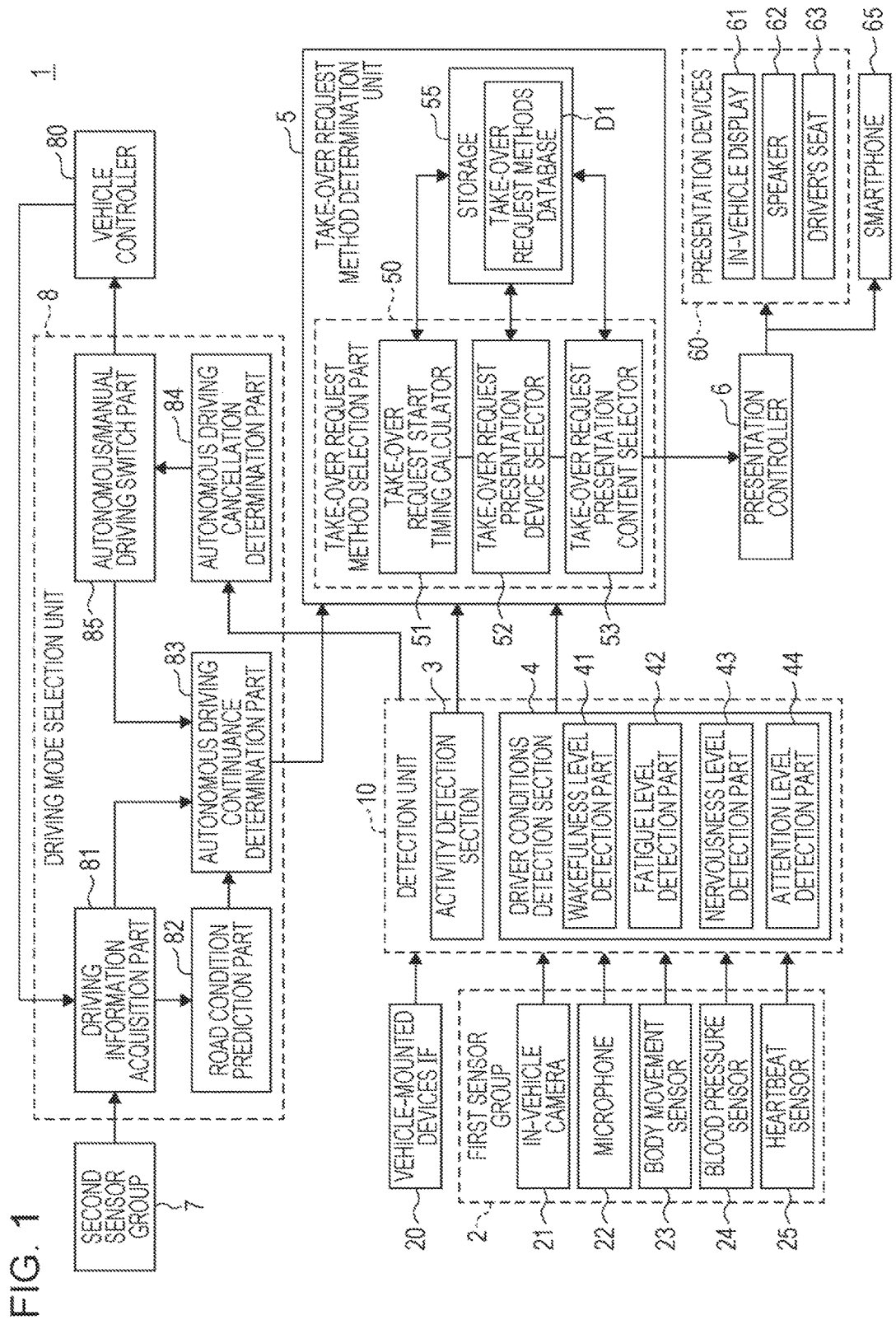
FIG. 1 is a block diagram illustrating the configuration of a driving assistance apparatus according to Embodiment 1.

DETAILED DESCRIPTION (Underlying Knowledge Forming Basis of the Present Disclosure)

As described earlier, the driver of a vehicle with a Level-3 autonomous driving system does not need to perform any driving task such as driving the vehicle or monitoring the driving situation, as long as the system is in stable operation. Freed from any driving tasks, the driver may engage in an activity unrelated to driving in the autonomous driving mode, such as watching TV or reading text messages on a smartphone. Herein, a "driver" is a person assumed to perform driving tasks during the manual driving mode. The driver may also be a person sitting in the driver's seat or a person preregistered at the system as a driver.

When the system reaches its functional limit, the driver needs to take over the driving tasks from the system. If the driver has been engaging in the driving-unrelated activity for a long time, it is possible that there is a notable decrease in the driver's consciousness of driving, such as situational awareness of the surrounding environment and perception of the conditions of the host vehicle. When the driving mode switches to the manual driving mode with the driver in such a condition; the driver may be slow to respond to, or even miss; objects to be watched out for while driving the vehicle, which in the worst scenario could lead to a traffic accident.

Hence, commercialization of Level-3 autonomous driving systems requires a method for achieving a safe and smooth transition for a driver disengaged from a driving task to return to a state ready for manual driving.

As described earlier, Patent Document 1 discloses a method including: predicting road conditions ahead of the host vehicle; determining based on the prediction whether the system will be able to continue autonomous driving; and when determining that the autonomous driving will not be continuable, giving the driver a notice that the autonomous driving mode of the system is going to be cancelled. According to this method, the driver is given a notice of a transition from autonomous driving to manual driving, and therefore can get prepared for manual driving.

However, after earnest study, the inventors of the disclosure have found a problem in a conventional driving assistance apparatus, that is, the apparatus cannot check whether the driver is truly ready for manual driving when the autonomous driving mode is cancelled.

The method of Patent Document 1, in particular, starts presenting the take-over request once the distance from the host vehicle to a predicted position where the autonomous driving mode is going to cancelled falls to or below a predetermined value. Thus, depending on the driver's condition, such as strong drowsiness, at the time of the presentation of the take-over request, the take-over request may not give enough time for the driver to be ready for manual driving. It is also possible that the driver does not notice an autonomous driving take-over request if engaging in an activity such as watching TV or playing a video game with a smartphone when the take-over request is presented. The inventors of the present disclosure have therefore found that take-over requests need to be presented to the driver based on the driver's activity and consciousness level towards driving in the autonomous driving mode.

Japanese Unexamined Patent Application Publication No. 2015-210660 (hereinafter referred to as Patent Document 2) discloses a method that includes: estimating a driver's activity in an autonomous driving mode; if determining that the driver is engaging in an activity unrelated to driving, selecting a certain one of information presentation devices based on the activity; and presenting information to prompt the driver to stop the driving-unrelated activity. The method of Patent Document 2 estimates takeover time necessary for the driver to bring themselves from the driving-unrelated activity to a state ready for manual driving, and arrival time after which the system cannot continue autonomous driving, and when the takeover time is longer than the arrival time, immediately presents information to prompt the driver to stop the activity.

This method can change, based on the driver's activity in the autonomous driving mode, what device to use for the presentation of the information which prompts the driver to stop the driving-unrelated activity. For example, if the driver is engaging in an activity such as watching TV or playing a video game with a smartphone, the above method can present, on the screen of the smartphone, information prompting the driver to stop the activity. The inventors of the present disclosure have figured that such information prompting the driver to stop an activity can be regarded as a type of information by which a take-over request is presented.

In the method of Patent Document 2, the timing to start presenting the information prompting the driver to stop their driving-unrelated activity is determined based on the takeover time necessary for the driver to return from the driving-unrelated activity to manual driving. This takeover time is determined for each type of activity that the driver may engage in.

However, when the driver is, for example, playing a video game using a smartphone in the autonomous driving mode, the driver may have been absorbed in the game for a long time, or may have been playing the game intermittently while occasionally monitoring the surrounding environment of the host vehicle. The time required for the driver to fully return from the game activity to manual driving should be different between these two situations. The actual takeover time is likely to be longer for the driver who has been absorbed in the game.

The conventional method does not take this into consideration and cannot ensure whether the driver can truly return to a state ready for manual driving when the autonomous driving mode is cancelled. This is the problem that the inventors of the present disclosure have noted in the conventional method. After earnest study, the inventors of the present disclosure have come to the view that the takeover time necessary to return to manual driving needs to be set in consideration of not only the type of activity that the driver is engaging in, but also physiological and psychological conditions of the driver engaging in that activity.

To this end, when the driving mode is going to be switched from the autonomous driving mode to the manual driving mode, a driving assistance apparatus according to one aspect of the present disclosure changes the method of presenting an autonomous driving take-over request to the driver, based on the driver's activity in the autonomous driving mode and the conditions of the driver engaging in that activity. This helps the driver return to manual driving safely and smoothly.

An embodiment of the present disclosure is described below with reference to the drawings.

Note that the embodiment described below illustrates comprehensive or specific examples. Numerical values, shapes, materials, constituents, the arrangements of the constituents, the connections of the constituents, steps, the order of the steps, and the like are just examples and are not intended to limit the present disclosure. The constituents in the following embodiment which are not included in the independent claim, which provides the broadest concept, are described as optional constituents.

Embodiment 1

A driving assistance apparatus according to Embodiment 1 is described below.

1. Configuration

The configuration of a driving assistance apparatus according to this embodiment is described below with reference to FIG. 1. FIG. 1 is a block diagram illustrating the configuration of a driving assistance apparatus 1 according to this embodiment.

As shown in FIG. 1, the driving assistance apparatus 1 includes a first sensor group 2, a vehicle-mounted devices interface 20 ("interface" will be abbreviated as "IF" hereinbelow), an activity detection section 3, a driver conditions detection section 4, and a take-over request method determination unit 5. The driving assistance apparatus 1 further includes a presentation controller 6, a second sensor group 7, a driving mode selection unit 8, and a vehicle controller 80. The driving assistance apparatus 1 is installed in a target vehicle for autonomous driving, and assists a transition from an autonomous driving mode in which the vehicle is driven under autonomous control to a manual driving mode in which the vehicle is driven by the driver.

The first sensor group 2 is a group of sensor devices that sense various types of information used for monitoring the driver of the vehicle. In this embodiment, the first sensor group 2 includes an in-vehicle camera 21, a microphone 22, a body movement sensor 23, a blood pressure sensor 24, and a heartbeat sensor 25. The sensors 21 to 35 of the first sensor group 2 and the vehicle-mounted devices IF 20 form an example of a sensor part in this embodiment.

The in-vehicle camera 21 is an example of a first camera that captures an image of an inside of the vehicle. The in-vehicle camera 21 generates image data that indicates a captured image. As an example, this embodiment assumes that the driver is in the driver's seat. The in-vehicle camera 21 is placed inside the vehicle to be able to capture an image near the driver's seat.

The microphone 22 is placed inside the vehicle and picks up ambient sound. The microphone 22 generates data (audio data) that indicates picked-up sound.

The body movement sensor 23 is formed by, for example, a load sensor placed inside the backrest or seat base of the driver's seat. The body movement sensor 23 senses a change in the posture of a person in the driver's seat, and generates a sensor signal indicative of the sensed result. The body movement sensor 23 may be formed by other sensors such as an acceleration sensor or an angular velocity sensor.

The blood pressure sensor 24 measures the blood pressure of the driver and generates a sensor signal indicative of the measurement result. For example, the blood pressure sensor 24 is configured as a wearable device and attached beforehand to the person responsible for driving in the manual driving mode.

The heartbeat sensor 25 measures the heartbeats of the driver, and generates sensor signals indicative of the measurement results. The heartbeat sensor 25 may be a contact sensor attached to a part of the body, such as an ear lobe, or may be a contactless sensor, such as a camera, that extracts a change in the color of the face corresponding to a pulse wave.

The vehicle-mounted devices IF 20 is an interface circuit (module) that exchanges signals with various devices in the vehicle using wireless or wired communications. The vehicle-mounted devices IF 20 performs communications in compliance with a predetermined communications standard, such as USB, HDMI (registered trademark), IEEE 1395, Wi-Fi, or Bluetooth (registered trademark).

For example, the vehicle-mounted devices IF 20 communicates with an automotive navigation system or a TV system mounted in the vehicle. In this embodiment, the vehicle-mounted devices IF 20 also communicates information with, for example, a smartphone 65 owned by the driver. For example, the vehicle-mounted devices IF 20 may communicate with the smartphone 65 wirelessly with an application for communicating with the vehicle-mounted devices IF 20 installed in the smartphone 65, or have a wired connection with the smartphone 65. Instead of or in addition to the smartphone 65, other types of portable information terminals may be used, such as a handheld game console, a tablet terminal, and a notebook PC.

The activity detection section 3 detects the driver's activity based on information from the sensors 21 to 25 of the first sensor group 2 and the vehicle-mounted devices IF 20. The activity detection section 3 may detect the driver's activity periodically. A description of how the activity detection section 3 detects an activity will be given later.

The driver conditions detection section 4 detects conditions of the driver related to the driver's consciousness towards driving based on information from the sensors 21 to 25 of the first sensor group 2 and the vehicle-mounted devices IF 20. The driver conditions detection section 4 may detect the conditions periodically. Hereinbelow, the conditions of the driver detected by the driver conditions detection section 4 may be collectively referred to as "driver conditions". The driver conditions include physiological conditions and psychological conditions. The physiological conditions are based on humans' physiological states, such as drowsiness and fatigue, and the psychological conditions are based on humans' psychological states, such as nervousness and concentration.

In this embodiment, the driver conditions detection section 4 includes, as an example, a wakefulness level detection part 41, a fatigue level detection part 42, a nervousness level detection part 43, and a concentration level detection part 44, which respectively detect the levels of wakefulness, fatigue, nervousness, and concentration of the driver. The levels of wakefulness and fatigue are each an example of a measure of a physiological condition of the driver, and the levels of nervousness and concentration are each an example of a measure of a psychological condition of the driver. A description of how the driver conditions detection section 4 detects the above measures will be given later.

For example, the activity detection section 3 and the driver conditions detection section 4 are implemented to form a detection unit 10 together. The detection unit 10 includes a CPU that may implement predetermined functions in cooperation with software, and thereby implements the functions of the activity detection section 3 and the driver conditions detection section 4. The detection unit 10 also includes an internal memory configured with a ROM, a RAM, and the like, and stores, at any time, the detection results obtained by the activity detection section 3 and the driver conditions detection section 4 in the internal memory.

The take-over request method determination unit 5 includes a take-over request method selection section 50 and a storage 55. The take-over request method selection section 50 includes a CPU that may implement predetermined functions in cooperation with software, and thereby implements the functions of a take-over request start timing calculator 51, a take-over request presentation device selector 52, and a take-over request presentation content selector 53 (which will be described later). Using these functions, the take-over request method selection section 50 selects a method of presenting, in the vehicle, a take-over request which informs the driver that the autonomous driving mode is going to be cancelled.

The storage 55 is a storage medium in which to store programs and data necessary for implementing the functions of the take-over request method determination unit 5, and is configured with a ROM, a RAM, and the like. For example, the storage 55 retains a take-over request methods database D1. The take-over request methods database D1 is a database in which driver's activities, driver's conditions, and methods of presenting a take-over request are managed in association with one another. Details of the functions of the take-over request method determination unit 5 will be described later.

The presentation controller 6 includes a CPU that may implement predetermined functions in cooperation with software, and controls presentation devices 60 capable of presenting information inside the vehicle in their respective ways. The presentation devices 60 include a display 61 of any vehicle-mounted device such as the navigation system, a speaker 62, a driver's seat 63, and the smartphone 65. For example, the presentation controller 6 controls the actuation of, for example, a vibration actuator embedded in the driver's seat 63 or mounted on the seatbelt.

In this embodiment, besides the display 61 of any vehicle-mounted device, the presentation controller 6 controls the smartphone 65 as one of the display presentation devices 60. The presentation controller 6 controls what image to display on the screen of the smartphone 65 or the like by, for example, communicating with the smartphone 65 via the vehicle-mounted devices IF 20.

The second sensor group 7 is a group of sensor devices that sense information used to monitor the situation outside the vehicle. The second sensor group 7 includes a camera 71, a radar 72, a GPS 73, and/or the like (see FIG. 9).

The camera 71 of the second sensor group 7 is placed at a position such as on the exterior surface of the vehicle and is an example of a second camera that captures an image of an environment outside of the vehicle (e.g., surrounding vehicles). The radar 72 may measure the position of and the distance to a vehicle or an obstacle existing near the host vehicle. The GPS 73 receives GPS information indicative of the position of the host vehicle from GPS satellites.

The driving mode selection unit 8 includes a CPU that may implement predetermined functions in cooperation with software, and includes a driving information acquisition part 81, a road condition prediction part 82, an autonomous driving continuance determination part 83, an autonomous driving cancellation determination part 84, and an autonomous/manual driving switch part 85. Based on the information obtained by the second sensor group 7, the driving mode selection unit 8 selects either the autonomous driving mode in which the vehicle is driven under autonomous control or the manual driving mode in which the vehicle is driven by the driver.

The vehicle controller 80 is configured with a CPU that may implement predetermined functions in cooperation with software, and controls the driving of the vehicle based on the driving mode currently selected. For example, in the autonomous driving mode, the vehicle controller 80 may control an electronic control unit (ECU) and actuators for acceleration, steering, and braking of the vehicle, using the information obtained by the second sensor group 7.

In the driving assistance apparatus 1 described above, each element of the detection unit 10, the take-over request method determination unit 5, the presentation controller 6, the driving mode selection unit 8, the vehicle controller 80, and the like may be configured by dedicated hardware, or may be implemented by execution of a software program appropriate for the element. Each element may be implemented when a program executor, such as a CPU or a processor, reads and executes a software program recorded in a recording medium, such as a hard disk or a semiconductor memory.

Some or all of the elements constituting the above-described devices may be formed by a single systematic large scale integration (LSI) circuit. A systematic LSI is an ultra-multifunctional LSI circuit manufactured by integration of multiple components on one chip. Specifically, a systematic LSI circuit is a computer system including a microprocessor, a ROM, a RAM, and the like. Computer programs are stored in the RAM. The systematic LSI circuit achieves its functions when the microprocessor operates according to the computer programs.

Further, some or all of the elements constituting the above-described devices may be formed by IC cards or modules capable of being attached to and detached from the devices. The IC cards or modules are each a computer system including a microprocessor, a ROM, a RAM, and the like. The IC cards or modules may include the above-described ultra-multifunctional LSI circuit. The IC cards or modules achieve their functions when the microprocessor operates according to computer programs. The IC cards or modules may be tamper-resistant.

2. Operations

Descriptions are given below of operations of the driving assistance apparatus 1 according to this embodiment, which is configured as described above.

2-1 Outline of the Operations

An outline of the operations of the driving assistance apparatus 1 according to this embodiment is described with reference to FIG. 1. Using the activity detection section 3 and the driver conditions detection section 4, the driving assistance apparatus 1 of this embodiment keeps monitoring an activity by the driver and conditions of the driver engaging in the activity while the vehicle is driving. In the autonomous driving mode, the driving mode selection unit 8 constantly determines, based on the road conditions and the like, whether autonomous driving will be continuable for a predetermined period of time (e.g., one hour) or longer from the current time.

If it is determined by the above determination processing that autonomous driving will not be continuable for the predetermined period of time or longer, the take-over request method determination unit 5 determines a method of presenting a notice of the cancellation of the autonomous driving mode by referring to the activity by the driver detected at that time and a detection result of a particular driver condition corresponding to that activity. Then, the presentation controller 6 presents the take-over request according to the determined method, including the timing for starting the presentation, a presentation device to use for the presentation, and the content of the presentation. The "particular driver condition" is a condition (e.g., a concentration level) deemed necessary in making a determination whether the driver can really return from the driving-unrelated activity to manual driving, and is predetermined for each of activities of the driver that may be detected.

Specifically, if the driver is engaging in a certain activity such as watching TV or playing a video game in the autonomous driving mode, the take-over request method determination unit 5 changes the timing to start the presentation of a take-over request, the device to use for the presentation (such as one that outputs sound or one that displays a screen), and the content of the presentation, based not only on the level of wakefulness of the driver engaging in the activity, but also on the level of concentration on the activity. For instance, if the driver is watching TV drowsily or is absorbed in playing a video game and extremely concentrated on the screen, it is likely that the driver needs more time to be in a state capable of manual driving than usual. Thus, in this embodiment, the take-over request method determination unit 5 makes the timing to start presenting the take-over request earlier than usual and highlights the take-over request more than usual by selecting such a presentation device and content.

As described above, the driving assistance apparatus 1 according to this embodiment changes the method of presenting a notice of autonomous driving cancellation according to the driver's activity and conditions, helping the driver who has been disengaged from driving in the autonomous driving mode return safely and smoothly to a state capable of manual driving. The following provides detailed descriptions about the operations of the driving assistance apparatus 1 according to this embodiment.

2-2. How the Driver's Activity is Detected

Figure 2:
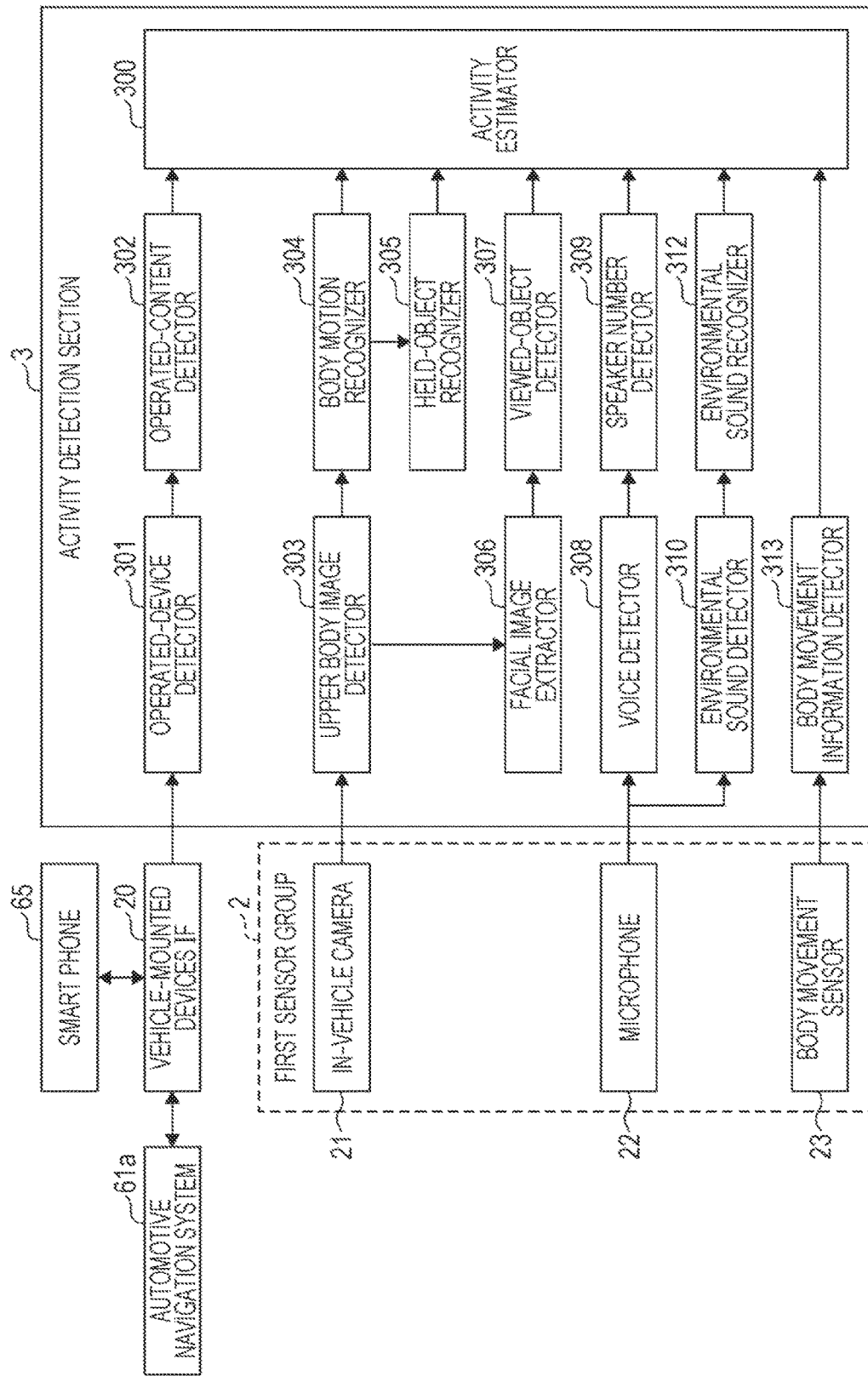
FIG. 2 is a functional block diagram exemplifying functions of an activity detection section in the driving assistance apparatus.

With reference to FIGS. 2 and 3, a description is given of how the activity detection section 3 detects the driver's activity. FIG. 2 is a functional block exemplifying functions of the activity detection section 3 in the driving assistance apparatus 1. FIG. 3 is a diagram illustrating operation of the activity detection section 3.

As shown in FIG. 2, the activity detection section 3 includes an activity estimator 300 that detects an activity in which the driver is presumably engaging. The activity detection section 3 receives sensor signals from the sensors 21, 22, and 23 of the first sensor group 2 and an output signal from the vehicle-mounted devices IF 20, and sequentially performs detection processing for recognizing the activity in which the driver is engaging while the vehicle is driving.

Based on the results of the detection processing, the activity estimator 300 detects an activity by the driver among various kinds of activities, such as texting, playing a video game, watching TV, and so on. Examples of the activities are listed in FIG. 3.

When a device communicatively connected to the vehicle-mounted devices IF 20, such as an automotive navigation system 61a or the smartphone 65, is operated, the vehicle-mounted devices IF 20 receives operation information including the device being operated and the content of the operation, and generates an output signal indicating the operation information.

As shown in FIG. 2, the activity detection section 3 includes an operated-device detector 301 and an operation content detector 302. Based on the output signal from the vehicle-mounted devices IF 20, the operated-device detector 301 detects the device indicated by the operation information included in the output signal, and the operation content detector 302 detects the content of the operation indicated by the operation information.

For instance, if the driver is playing a video game using the smartphone 65, the operated-device detector 301 of the activity detection section 3 detects the smartphone 65 as the device being operated, and the operation content detector 302 of the activity detection section 3 detects that the content of the operation is playing a video game. Thus, the activity estimator 300 estimates that the driver's activity is "playing a video game with a smartphone".

As shown in FIG. 2, the activity detection section 3 further includes an upper body image detector 303, a body motion recognizer 304, a held-object recognizer 305, a facial image extractor 306, and a viewed-object detector 307. The activity detection section 3 receives image data indicating an image captured by the in-vehicle camera 21, and performs the following image recognition processing using these parts of the activity detection section 3 based on the image captured by the in-vehicle camera 21.

Based on the image data from the in-vehicle camera 21, the upper body image detector 303 detects an image of the upper body of the driver in the captured image. For example, with image data on an image captured when no one is in the driver's seat being stored in the internal memory in advance, the upper body image detector 303 reads the stored image data, compares it with image data on an image which has just been captured, and detects an upper body image based on the different between these pieces of image data.

The body motion recognizer 304 recognizes a body motion of the driver engaging in a certain activity based on the upper body image detected. Specifically, for example, the body motion recognizer 304 may detect the positions and postures of the arms and hands based on the contour of the upper body image. Body motions of the driver include touching the screen of a device with a finger, pushing a button on a device, moving a hand and/or an arm to hold an object, and moving the mouth to eat or speak.

When the body motion of holding an object has been detected, the held-object recognizer 305 performs image processing to recognize the object being held. For example, the held-object recognizer 305 extracts an image of the object being held near the hand from the upper body image, compares it with each piece of image data stored in advance as held-object candidates, such as a smartphone, a game console, and a book, and determines the similarities between the extracted image and the stored image data.

The facial image extractor 306 extracts a facial image from the detected upper body image based for example on a feature amount related to human faces. Alternatively, the facial image extractor 306 may extract a facial image from the image data on the entire captured image.

The viewed-object detector 307 detects the object at which the driver is looking, based on the orientation of the face detected in the extracted facial image or from the direction of the line of sight estimated from images of the eyes extracted from the facial image. For example, the viewed-object detector 307 detects an object towards which the face or the eyes are directed, by analyzing the entire captured image or estimating the arrangement of devices in the vehicle based on the position of the in-vehicle camera 21.

By the image recognition processing described above, the activity estimator 300 can detect an activity, such as operating a device, watching content on a device (these devices do not have to be communicatively connected to the vehicle-mounted devices IF 20), reading a book, a document, or the like, and eating (see FIG. 3).

As shown in FIG. 2, the activity detection section 3 further includes a voice detector 308, a speaker number detector 309, an environmental sound detector 310, and an environmental sound recognizer 311. The activity detection section 3 receives data on sound picked up by the microphone 22, and performs voice recognition processing and environmental sound recognition processing using these parts as follows.

The voice detector 308 detects human voice by, for example, extracting a feature amount unique to a human voice from the data on sound picked up by the microphone 22. The speaker number detector 309 detects the number of speakers based for example on the individual differences among the feature amounts of the voices detected. Thereby, when a human voice is detected, the activity detection section 3 can presume that the driver activity is, as illustrated in FIG. 3, talking on the phone if there is one speaker, and talking with a passenger or passengers if there is more than one speaker.

The environmental sound detector 310 detects an environmental sound in the data on the sound picked up by the microphone 22, the environmental sound being determined as not being a human voice based on predetermined feature amounts and the like. The environmental sound recognizer 311 performs processing for identifying the environmental sound detected. For example, the environmental sound recognizer 311 compares the detected environmental sound with each piece of environmental sound data pre-stored as environmental sound candidates, such as music, radio sound, chewing sound, or sound generated by operation of a device such as a shaver.

As shown in FIG. 2, the activity detection section 3 further includes a body movement information detector 313. The body movement information detector 313 detects body movement information on a body movement of the driver based on a sensor signal from the body movement sensor 23. The body movement information detector 313 thus detects a body movement that the driver makes to change their position during a certain one of various activities, and thereby improves the accuracy of the body motion detected to estimate the driver's activity (see FIG. 3).

2-3. How Driver's Conditions are Detected

Hereinbelow, a description is given of how the driver conditions detection section 4 detects driver conditions.

2-3-1. Methods for Detecting the Level of Wakefulness

With reference to FIG. 4, a description is given of how the wakefulness level detection part 41 of the driver conditions detection section 4 detects the level of wakefulness. FIG. 4 is a functional block diagram exemplifying functions of the wakefulness level detection part 41 in the driving assistance apparatus 1.

In this embodiment, the level of wakefulness is a measure of how awake the driver is, as opposed to how drowsy they are. Hence, when drowsy, the driver has a low level of wakefulness.

The wakefulness level detection part 41 detects the level of wakefulness of the driver by, for example, analyzing an image captured by the in-vehicle camera 21. As shown in FIG. 4, the wakefulness level detection part 41 includes a facial image extractor 411, an eye opening degree detector 412, an eye blink detector 413, a head position detector 414, and a wakefulness level estimator 410.

The wakefulness level detection part 41 performs image analysis using its parts as follows. First, the facial image extractor 411 acquires image data from the in-vehicle camera 21 at any time, and extracts a facial image of the driver from the captured image. Next, the eye opening degree detector 412 detects the eye opening degree indicating how much the eyelids are open in the extracted facial image. It is likely that the drowsier the driver is, the more the eyelids are closed, making the eye opening degree smaller. Thus, the wakefulness level estimator 410 calculates an estimated level of wakefulness based on the eye opening degree detected: the smaller the eye opening degree, the lower the level of wakefulness.

In addition, when the driver is drowsy, the period of time the eyelids are closed in one blink is likely to be long, making the number of blinks fewer. Thus, the eye blink detector 413 detects how long the eyelids are closed and how many times the eyes blink based on facial images captured over a predetermined period of time (e.g., one minute). The wakefulness level estimator 410 estimates the level of wakefulness based on the eye-closed time and the number of eye blinks detected: the longer the eye-closed time and/or the smaller the number of eye blinks, the lower the level of wakefulness.

When the driver is drowsy, the position of the head may be unstable. Thus, the head position detector 414 detects the position of the head of the driver based on the position of the facial image extracted from the image captured by the in-vehicle camera 21. The wakefulness level estimator 410 estimates the level of wakefulness based on detection results of the position of the head over a predetermined period of time (e.g., one minute): the larger the rate of change in the position of the head, the lower the level of wakefulness.

In addition to or instead of the above analysis of captured images, the wakefulness level detection part 41 may detect the level of wakefulness by analyzing voice in the vehicle. When the driver is asleep, sleeping sound such as a snore may be observed. In view of this, the wakefulness level detection part 41 includes a breathing sound detector 415. The breathing sound detector 415 detects breathing sound of the driver from data on sound picked up by the microphone 22, and determines whether the detected breathing sound contains sleeping sound such as a snore. The wakefulness level estimator 410 lowers the estimated level of wakefulness every time it determines that the detected breathing sound contains sleeping sound.

The wakefulness level detection part 41 may detect the level of wakefulness based on a measurement result from the heartbeat sensor 25. It is known that in heart rate variability (HRV) containing a high frequency (HF) component (e.g., 0.15 to 0.40 Hz) and a low frequency (LF) component (e.g., 0.04 Hz to 0.15 Hz), the HF component, which is attributable to a parasympathetic activity, is elevated when humans are drowsy.

In view of this, as shown in FIG. 4, the wakefulness level detection part 41 includes a heart rate variation detector 416 and an LF/HF detector 417. The heart rate variation detector 416 detects heart rate variation based on sensor signals from the heartbeat sensor 25. The LF/HF detector 417 detects the ratio of the LF component to the HF component (LF/HF) in the heart rate variation detected. The wakefulness level estimator 410 estimates the level of wakefulness based on the LF/HF ratio detected: the smaller the LF/HF ratio, the lower the level of wakefulness.

As shown in FIG. 4, the wakefulness level detection part 41 may include a body movement information detector 418. When the driver moves often, the driver is likely to be awake. In view of this, the body movement information detector 418 detects, based on sensor signals from the body movement sensor 23, body movement information indicating that there has been a body movement of the driver. The wakefulness level estimator 410 estimates the level of wakefulness based on body movements detected based on the body movement information: the more the body movements, the higher the level of wakefulness.

As shown in FIG. 4, the wakefulness level detection part 41 may include an operation frequency detector 419. When a device is operated frequently, the driver is likely to be awake. Thus, the operation frequency detector 419 detects an operation frequency based on operation information included in output signals from the vehicle-mounted devices IF 20 over the past predetermined time (e.g., one minute). The operation frequency indicates the number of times a device is operated within a predetermined period of time. The wakefulness level estimator 410 estimates the level of wakefulness based on the operation frequency detected: the higher the operation frequency, the higher the level of wakefulness.

Figure 5:
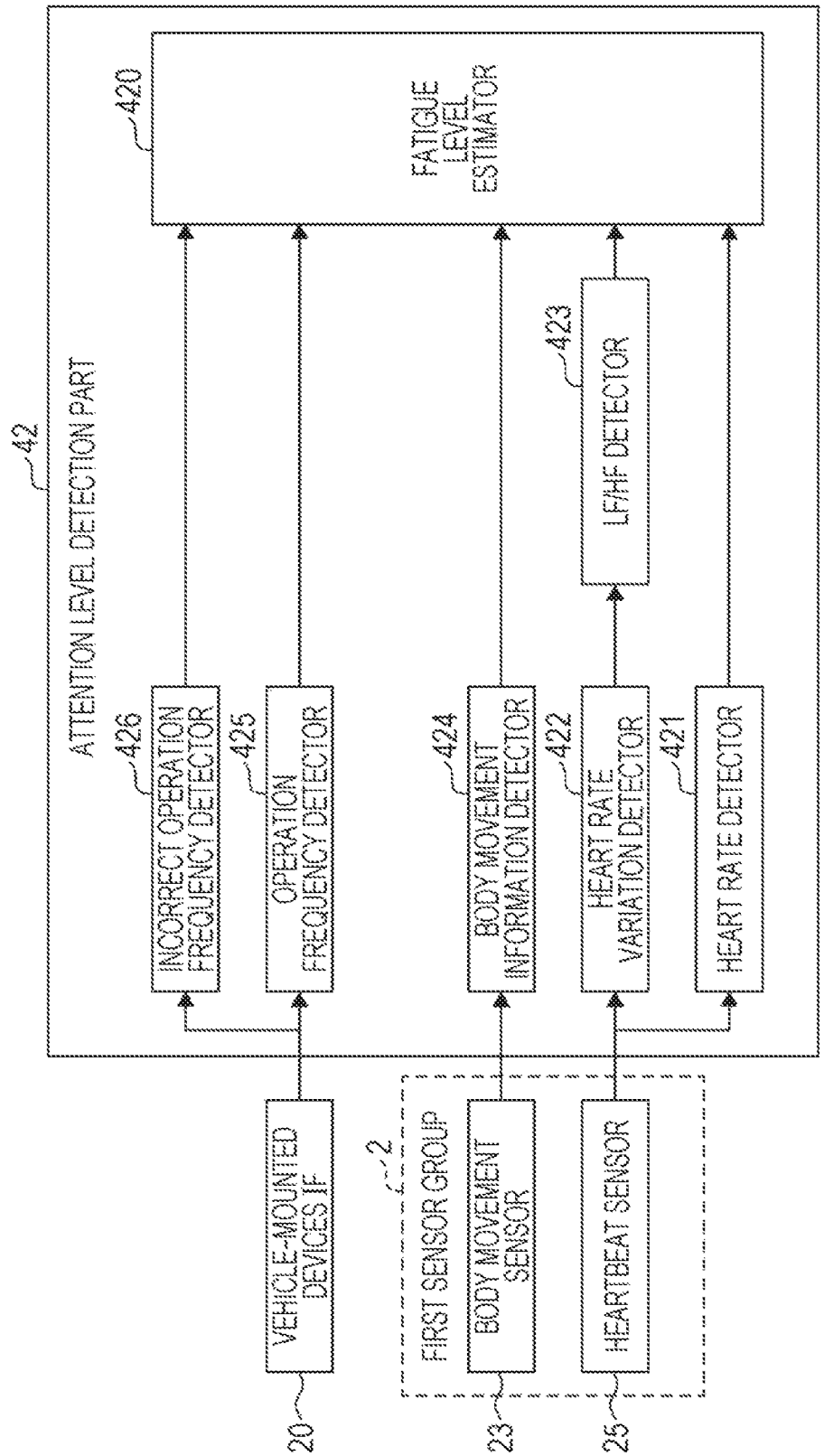
FIG. 5 is a functional block diagram exemplifying functions of a fatigue level detection part in the driving assistance apparatus.

In the examples described above, the wakefulness level estimator 410 estimates the level of wakefulness according to a result obtained by any of the eye opening degree detector 412, the eye blink detector 413, the head position detector 414, the breathing sound detector 415, the LF/HF detector 417, the operation frequency detector 419, and the body movement information detector 418. However, the present disclosure is not limited to such examples, and the wakefulness level estimator 410 may estimate the level of wakefulness by considering all the results from the detectors comprehensively, 2-3-2. Methods for Detecting the Level of Fatigue With reference to FIG. 5, a description is given of how the fatigue level detection part 42 of the driver conditions detection section 4 detects the level of fatigue. FIG. 5 is a functional block diagram exemplifying functions of the fatigue level detection part 42 in the driving assistance apparatus 1.

In this embodiment, the level of fatigue is a measure of how tired the driver is physically.

For example, the fatigue level detection part 42 detects the level of fatigue based on measurement results from the heartbeat sensor 25. As shown in FIG. 5, the fatigue level detection part 42 includes a heart rate detector 421, a heart rate variation detector 422, an LF/HF detector 423, and a fatigue level estimator 420.

The heart rate detector 421 detects the heart rate (HR) of the driver based on sensor signals from the heartbeat sensor 25. When the driver is tired, their heart rate may depart from the average heart rate at rest. In view of this, the fatigue level estimator 420 calculates an estimated level of fatigue based on the difference between the detected heart rate and the preset standard heart rate: the larger the difference, the higher the level of fatigue.

In addition, the heart rate variation detector 422 and the LF/HF detector 423 of the fatigue level detection part 42 detect a heart rate variation and an LF/HF ratio, respectively, as those of the wakefulness level detection part 41 do. In the heart rate variation, the LF component, which is attributable to a sympathetic activity, is thought to be elevated when the driver is tired. In view of this, the fatigue level estimator 420 estimates the level of fatigue based on the LF/HF ratio detected: the larger the LF/HF ratio, the higher the level of fatigue.

Further, as shown in FIG. 5, the fatigue level detection part 42 may include a body movement information detector 424 that detects body movement information as that of the wakefulness level detection part 41 does. When the driver is tired, it is likely that the driver frequently changes their posture to adjust themselves or the like, and therefore moves more often than usual. In view of this, the fatigue level estimator 420 estimates the level of fatigue based on the detected body movement information: the more the driver has been moving, the higher the level of fatigue.

In addition, as shown in FIG. 5, the fatigue level detection part 42 may include an operation frequency detector 425 and an incorrect operation detector 426. As the operation frequency detector 419 of the wakefulness level detection part 41 does, the operation frequency detector 425 of the fatigue level detection part 42 detects operation frequency based on operation information from the vehicle-mounted devices IF 20. The incorrect operation detector 426 detects incorrect operation frequency based on operation content included in the operation information from the vehicle-mounted devices IF 20. The incorrect operation frequency is the number of incorrect operations performed within a predetermined period of time.

In is assumed in this embodiment that the driver gets tired from performing a driving-unrelated activity in the autonomous driving mode. For example, if the driver feels tired when operating a smartphone, it is likely that the operation frequency decreases and the number of incorrect operations increases. In view of this, the fatigue level estimator 420 estimates the level of fatigue based on the operation frequency and the incorrect operation frequency detected: the lower the operation frequency and/or the higher the detected incorrect operation frequency, the higher the level of fatigue.

In the examples described above, the fatigue level estimator 420 estimates the level of fatigue according to a result obtained by any of the heart rate detector 421, the heart rate variation detector 422, the LF/HF detector 423, the body movement information detector 424, the operation frequency detector 425, and the incorrect operation detector 426. However, the present disclosure is not limited to such examples, and the fatigue level estimator 420 may estimate the level of fatigue by considering all the results from the detectors comprehensively.

2-3-3. Methods for Detecting the Level of Nervousness

Figure 6:
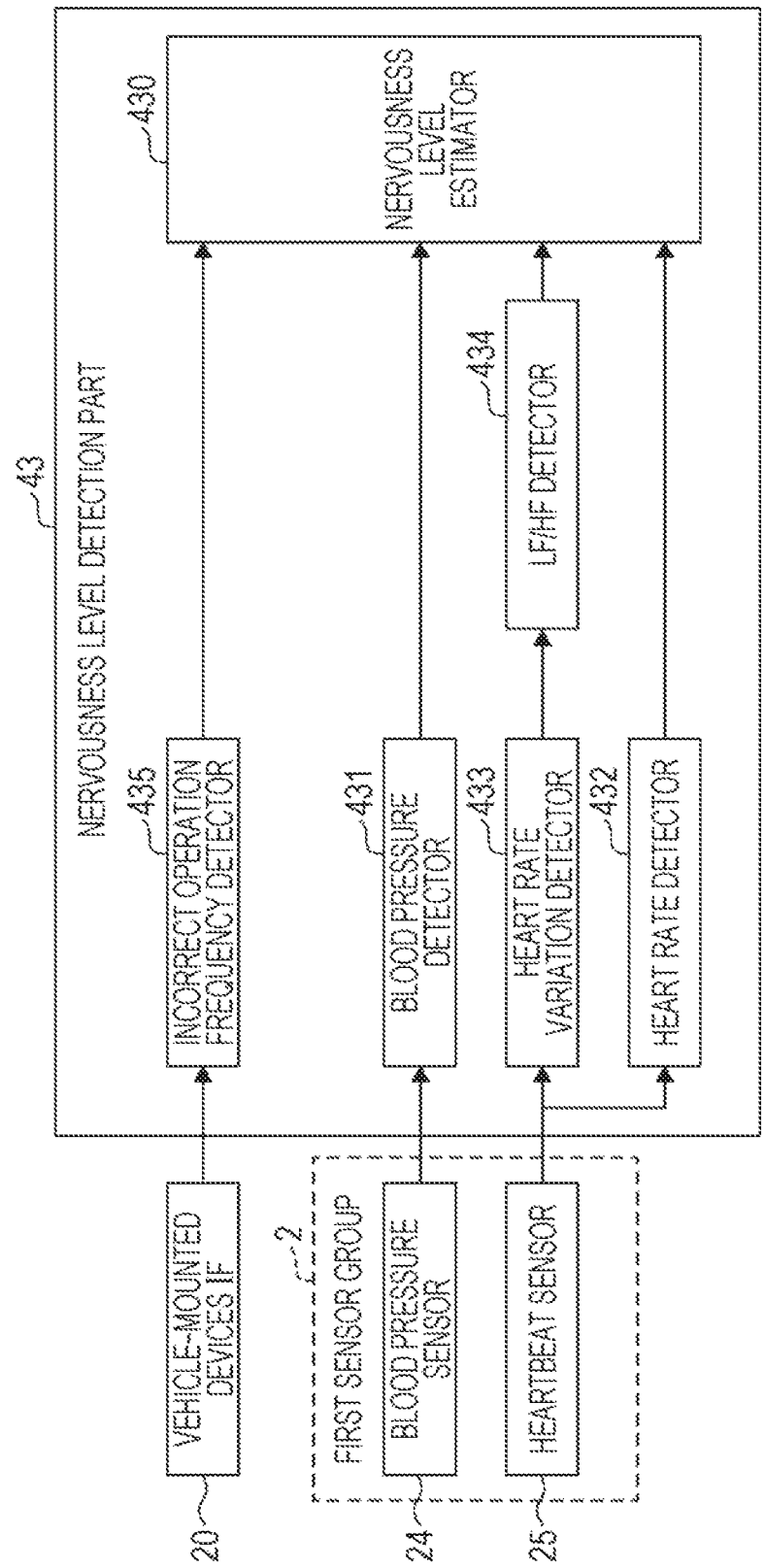
FIG. 6 is a functional block diagram exemplifying functions of a nervousness level detection part in the driving assistance apparatus.

With reference to FIG. 6, a description is given of how the nervousness level detection part 43 of the driver conditions detection section 4 detects the level of nervousness. FIG. 6 is a functional block diagram exemplifying functions of the nervousness level detection part 43 in the driving assistance apparatus 1.

In this embodiment, the level of nervousness is a measure of how nervous (or excited) the driver is.

For example, the nervousness level detection part 43 detects the level of nervousness based on a measurement result from the blood pressure sensor 24. As shown in FIG. 6, the nervousness level detection part 43 includes a blood pressure detector 431 and a nervousness level estimator 430.

The blood pressure detector 431 detects the blood pressure of the driver based on a sensor signal from the blood pressure sensor 24. Humans tend to have a higher blood pressure when they are nervous. In view of this, the nervousness level estimator 430 calculates an estimated level of nervousness based on the blood pressure detected: the higher the blood pressure, the higher the level of nervousness.

As shown in FIG. 6, the nervousness level detection part 43 may include a heart rate detector 432, a heart rate variation detector 433, and an LF/HF detector 434 that detect, respectively, a heart rate, a heart rate variation, and an LF/HF ratio as those in the fatigue level detection part 42 do.

Humans tend to have a higher heart rate when they are nervous. In view of this, the nervousness level estimator 430 estimates the level of nervousness based on the heart rate detected: the higher the heart rate, the higher the level of nervousness. Moreover, humans tend to have a heart rate variation with an elevated LF component when they are nervous. In view of this, the nervousness level estimator 430 estimates the level of nervousness based on the LF/HF ratio detected: the larger the LF/HF ratio, the higher the level of nervousness.

In addition, as shown in FIG. 6, the nervousness level detection part 43 may include an incorrect operation detector 435 that detects the frequency of incorrect operations as that of the fatigue level detection part 42 does. When nervous while operating a smartphone or the like, the driver tends to perform incorrect operations more than usual. In view of this, the nervousness level estimator 430 estimates the level of nervousness based on the incorrect operation frequency detected: the greater the incorrect operation frequency, the higher the level of nervousness.

In the examples described above, the nervousness level estimator 430 estimates the level of nervousness according to a result obtained by any of the blood pressure detector 431, the heart rate detector 432, the heart rate variation detector 433, the LF/HF detector 434, and the incorrect operation detector 435. However, the present disclosure is not limited to such examples, and the nervousness level estimator 430 may estimate the level of nervousness by considering all the results from the detectors comprehensively.

2-3-4. Methods for Detecting the Level of Concentration

Figure 7:
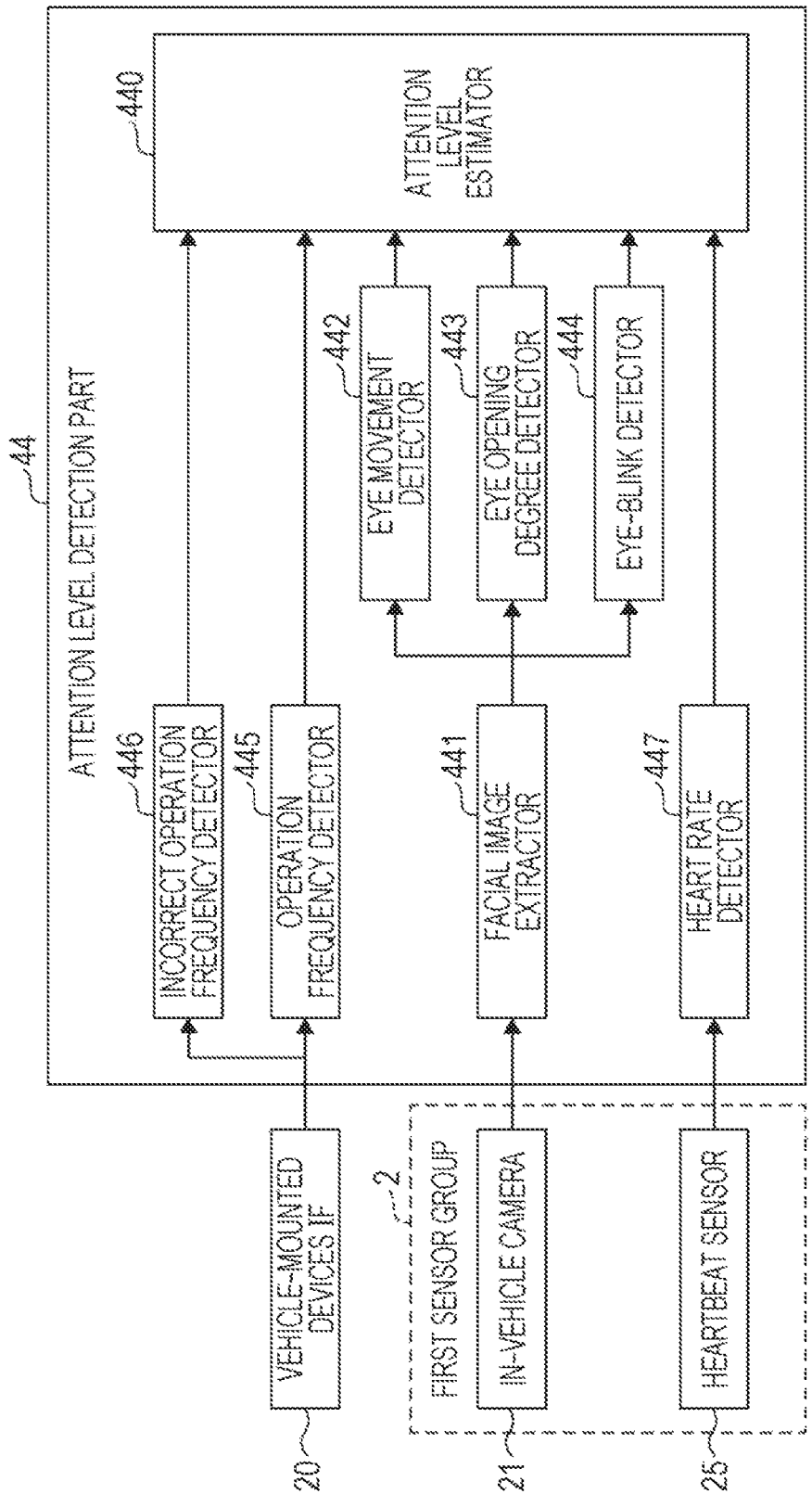
FIG. 7 is a functional block diagram exemplifying functions of a concentration level detection part in the driving assistance apparatus.

With reference to FIG. 7, a description is given of how the concentration level detection part 44 of the driver conditions detection section 4 detects the level of concentration. FIG. 7 is a functional block diagram exemplifying functions of the concentration level detection part 44 in the driving assistance apparatus 1.

In this embodiment, the level of concentration is a measure of how much the driver is concentrated on the activity in which they are engaging.

For example, the concentration level detection part 44 detects the level of concentration by analyzing images captured by the in-vehicle camera 21. As shown in FIG. 7, the concentration level detection part 44 includes a facial image extractor 441, an eye movement detector 442, and a concentration level estimator 440. The facial image extractor 441 of the concentration level detection part 44 extracts a facial image as that of the wakefulness level detection part 41 does.

The eye movement detector 442 identifies the positions of the eyes in the facial images extracted over a predetermined period of time (e.g., one minute) and detects the movement of the eyes, that is, an eye movement rate. When the driver is highly concentrated on an activity in which they are engaging, they tend to fix their eyes on the object involved in the activity (such as the screen of a portable game console), making fewer eye movements. In view of this, the concentration level estimator 440 calculates an estimated level of concentration based on the eye movement rate detected: the lower the eye movement rate, the higher the level of concentration.

As shown in FIG. 7, in addition to or instead of the eye movement detector 442, the concentration level detection part 44 may include an eye opening degree detector 443 that detects how much the eyes are open as that of the wakefulness level detection part 41 does, and/or an eye blink detector 444 that detects the number of eye blinks as that of the wakefulness level detection part 41 does. When the driver is concentrated, it is likely that they open their eyes wider and blink less. In view of this, the concentration level estimator 440 estimates the level of concentration based on the eye opening degree detected and/or the number of eye blinks detected: the larger the eye opening degree and/or the smaller the number of eye blinks, the higher the level of concentration.

As shown in FIG. 7, the concentration level detection part 44 may further include an operation frequency detector 445 that detects the operation frequency as that of the fatigue level detection part 42 does, and/or an incorrect operation frequency detector 446 that detects the incorrect operation frequency as that of the fatigue level detection part 42 does. For example, when the driver is playing a video game with a portable game console and is highly concentrated, it is likely that the driver performs more operations on the console than usual and perform fewer incorrect operations than usual. In view of this, the concentration level estimator 440 estimates the level of concentration based on the operation frequency detected and/or the incorrect operation frequency detected: the higher the operation frequency and/or the lower the incorrect operation frequency, the higher the level of concentration.

As shown in FIG. 7, the concentration level detection part 44 may further include a heart rate detector 447 that detects heart rate as that of the fatigue level detection part 42 does. When the driver is highly concentrated, it is likely that the driver has a higher heart rate than usual, irrespective of the kind of activity in which they are engaging. In view of this, the concentration level estimator 440 estimates the level of concentration based on the heart rate detected: the higher the heart rate, the higher the level of concentration.

In the examples described above, the concentration level estimator 440 estimates the level of concentration according to a result obtained by any of the facial image extractor 441, the eye movement detector 442, the eye opening degree detector 443, the eye blink detector 444, the operation frequency detector 445, the incorrect operation frequency detector 446, and the heart rate detector 447. However, the present disclosure is not limited to such examples, and the concentration level estimator 440 may estimate the level of concentration by considering all the results from the detectors comprehensively.

2-4. Processing for Cancelling the Autonomous Driving Mode

With reference to FIGS. 1 and 8, a description is given of cancellation processing executed for cancellation of the autonomous driving mode. FIG. 8 is a flowchart illustrating how the driving assistance apparatus 1 performs the cancellation processing to cancel the autonomous driving mode.

The cancellation processing as illustrated in the flowchart of FIG. 8 is performed by the driving assistance apparatus 1 in the autonomous driving mode. During this cancellation processing, the activity detection section 3 and the driver conditions detection section 4 iterate their detection operations described above.

First, in the driving mode selection unit 8 of the driving assistance apparatus 1 (see FIG. 1), the road condition prediction part 82 predicts road conditions based on driving information from the driving information acquisition part 81 (S1). For example, if the host vehicle is travelling on an expressway, the road condition prediction part 82 predicts the time it will take to arrive at the exit of the expressway. The driving information indicates the driving conditions of the host vehicle and the surrounding environment of the host vehicle. A description will be given later of how the driving information is acquired.

Next, based on the prediction results of the road conditions and the driving information, the autonomous driving continuance determination part 83 determines whether the autonomous driving mode will be continuable for a predetermined period of time or longer from the current time (S2). This predetermined period of time is set with a margin for advancing the timing to start presenting a take-over request to the maximum degree, or in other words, the time considered enough to bring the driver who has been disengaged from driving back to a state capable of manual driving, well in advance of the cancellation of the autonomous driving mode. An example of the predetermined period of time is ten minutes.

If it is determined that the autonomous driving mode will be continuable (Yes in S2), the driving mode selection unit 8 returns to Step S1 and iterates the processing at a predetermined interval (e.g., one minute).

If it is determined that the autonomous driving will not be continuable (No in S2), the take-over request method selection section 50 of the take-over request method determination unit 5 acquires information on the activity detected by the activity detection section 3 and information on the driver's conditions detected by the driver conditions detection section 4, these pieces of information being ones detected at the time of the determination. Based on the thus-acquired detection results of the driver's activity and conditions, the take-over request method determination unit 5 determines a take-over request method (S3).

The take-over request method specifies how a take-over request is presented inside the vehicle. In Step S3, the take-over request start timing calculator 51 of the take-over request method selection section 50 calculates the timing to start presenting a take-over request, and sets the timing in, for example, the presentation controller 6. The take-over request presentation device selector 52 selects, from the presentation devices 60, a presentation device to use to present the take-over request, and sets the presentation device in the presentation controller 6. The take-over request presentation content selector 53 selects the content to present in the take-over request and sets the presentation content in the presentation controller 6. A detailed description will be given of processing for determining the take-over request method.

Next, the presentation controller 6 determines whether the current time has reached the start timing set by the take-over request start timing calculator 51 (S4). The presentation controller 6 iterates this step until the current time reaches the set start timing.

When the current time reaches the set start timing (Yes in S4), the presentation controller 6 presents the take-over request according to the take-over request method determined by the take-over request method determination unit 5 (S5). Specifically, the presentation controller 6 controls the presentation of the take-over request so that the take-over request may be presented with the selected content using the selected presentation device.

Next, based on the driver's activity and conditions detected after the presentation of the take-over request, the autonomous driving cancellation determination part 84 of the driving mode selection unit 8 determines whether the driver is ready for manual driving (S6). The autonomous driving cancellation determination part 84 performs this processing by determining, for example, whether the driver has stopped the driving-unrelated activity or whether the driver is looking ahead of the vehicle. This determination may also be made using detection results of physiological/psychological conditions, such as the driver's wakefulness level (by checking whether the wakefulness level is not too low), when appropriate.

If it is determined that the driver is not ready for manual driving (No in S6), the take-over request method determination unit 5 determines a take-over request method anew (S3). In this case, the take-over request method is re-set considering the fact that the take-over request is going to be presented a second time.

If it is determined that the driver is ready for manual driving (Yes in S6), the autonomous/manual driving switch part 85 controls the vehicle controller 80 so that the vehicle controller 80 will cancel the autonomous driving mode and switch the driving mode to the manual driving mode (S7). Then, the vehicle controller 80 cancels the autonomous driving control of the vehicle.

With this, the driving mode of the vehicle is switched to the manual driving mode, and the driving assistance apparatus 1 ends the processing illustrated in the flowchart of FIG. 8.

Before a transition from the autonomous driving mode to the manual driving mode, the above-described cancellation processing changes the take-over request method in accordance with an activity in which the driver is engaging in the autonomous driving mode as well as physiological/psychological conditions of the driver engaging in that activity. This enables the driver to safely and smoothly return to manual driving.

In the example described above, after the determination in Step S3, the presentation controller 6 iterates the determination step S4 until the current time reaches the set start timing. However, the present disclosure is not limited to this. For example, it is possible that the driver's activity and conditions may change between the current time and the set start timing. For this reason, if for example the determination result of Step S4 is "No", the take-over request method determination unit 5 may check new detection results from the activity detection section 3 and the driver conditions detection section 4. If there is any change in the driver's activity or conditions, the take-over request method determination unit 5 may update the take-over request method according to the change.

Moreover, in the example described above, when the autonomous driving cancellation determination part 84 determines that the driver is not ready for manual driving (No in S6), the take-over request method determination unit 5 determines the take-over request method anew (S3). If the determination in Step S6 turns out to be "No" a predetermined number of times or more, the flowchart may be ended.

Then, the vehicle controller 80 may control the vehicle so that, for example, the vehicle will be parked in a safe place.

2-4-1. How the Driving Information is Acquired

With reference to FIG. 9, a description is given of how the driving information in Step S1 of the flowchart in FIG. 8 is acquired. FIG. 9 is a functional block diagram exemplifying functions of the driving information acquisition part 81.

As shown in FIG. 9, the driving information acquisition part 81 includes a vehicle travel position calculator 811, a map data storage 812, a vehicle travel information acquirer 813, a surrounding environment information acquirer 814, and a traffic information acquirer 815. The second sensor group 7 includes the camera 71, the radar 72, and the GPS 73. It is assumed that the vehicle is equipped with a wireless communication unit 11 as a communication module capable of wirelessly communicating with a network such as the Internet.

The driving information acquisition part 81 acquires GPS information from the GPS 73 of the second sensor group 7. The map data storage 812 has map data stored therein in advance. Based on the GPS information thus acquired, the vehicle travel position calculator 811 calculates the travelling position of the host vehicle on the map data stored in the map data storage 812.

The vehicle travel information acquirer 813 acquires vehicle travel information indicating travelling states, such as a travelling speed, of the host vehicle whose driving is controlled by the vehicle controller 80.

If, for example, the host vehicle is travelling on an expressway in the autonomous driving mode, in Step S1 of the flowchart in FIG. 8, the road condition prediction part 82 estimates, based on information of the vehicle position, the map data, and the vehicle travel information, the time it will take for the host vehicle to arrive at the exit of the expressway. Then, in Step S2 of the flowchart in FIG. 8, the autonomous driving continuance determination part 83 compares the estimated time and the predetermined period of time which has been set in advance (see 2-4), and proceeds to "No" when the estimated time falls below the predetermined time.

The surrounding environment information acquirer 814 acquires image data on captured images of the environment outside the host vehicle from the camera 71. The surrounding environment information acquirer 814 may also acquire measurement information from the radar 72. The image data from the camera 71 and the measurement information from the radar 72 are each an example of surrounding environment information including information on vehicles surrounding the host vehicle.

The traffic information acquirer 815 acquires traffic information from the wireless communication unit 11. The traffic information indicates real-time traffic conditions, such as the location and size of traffic congestion, which are available on the Internet or the like.

Based on information such as the surrounding environment information acquired by the surrounding environment information acquirer 814 and the traffic information acquired by the traffic information acquirer 815, the road condition prediction part 82 predicts, for example, the traffic conditions surrounding the host vehicle within the aforementioned predetermined period of time. For instance, the road condition prediction part 82 predicts whether the host vehicle would pass the congested area within the predetermined time. Based on a result of the prediction by the road condition prediction part 82, the autonomous driving continuance determination part 83 determines whether the autonomous driving mode will be continuable for the predetermined period of time or longer from the current time, or in other words, whether the autonomous driving system will face its functional limit.

2-4-2. Processing for Determining the Take-Over Request Method

With reference to FIGS. 10 to 13, a description is given of processing for determining the take-over request method in Step S3 of the flowchart in FIG. 8.

FIG. 10 shows an example of an activities and conditions table D2. In Step S3 of the flowchart in FIG. 8, the take-over request method determination unit 5 refers to the activities and conditions table D2 and selects, from various measures indicative of driver conditions, a measure used to determine the take-over request method. The activities and conditions table D2 is a data table in which each driver activity is recorded in association with measures of driver conditions which should be considered for the driver activity.

In the activities and conditions table D2 exemplified in FIG. 10, detection target activities are each associated with wakefulness level, fatigue level, nervousness level, and concentration level. The detection target activities include texting, using SNS, browsing the Web, playing a video game, watching TV, reading, listening to music, listening to the radio, conversing, talking on the phone, having a meal, and performing personal maintenance (such as shaving or putting on a makeup). In Step S3 of the flowchart in FIG. 8, the take-over request method selection section 50 selects measures that are assigned "O" in the activities and conditions table D2 for the activity detected by the activity detection section 3.

In the activities and conditions table D2 exemplified in FIG. 10, concentration level is assigned "O" for activities such as texting, using SNS, browsing the Web, playing a video game, watching TV, having a meal, and performing personal maintenance. This is because when the driver is concentrated on such activities, it is likely that the driver fixes their eyes to a particular object (such as the game screen if playing a video game) and pays almost no attention to, for example, the environment surrounding the host vehicle. This means it may take a longer time for the driver to return to manual driving.

No matter what the activity, even for an activity such as talking on the phone, if the driver is in a psychological state where they feel nervous, it is likely that it would take time for the driver to return to manual driving. In view of this, nervousness level is assigned "O" for all the activities exemplified in FIG. 10.

Some activities may make the driver tired or drowsy. Thus, the fatigue level and the wakefulness level are assigned "O" for such particular activities exemplified in FIG. 10.

From the driver conditions detection section 4, the take-over request method determination unit 5 acquires estimated levels of the respective measures selected as described above based on the activity detected by the activity detection section 3, and determines a take-over request method by referring to the take-over request methods database D1.

FIG. 11 shows an example of the take-over request methods database D1. The take-over request methods database D1 manages driver's activities, driver's conditions, and take-over request methods in association with one another. FIG. 11 shows an example of the take-over request methods database D1 where the driver's activities are categorized into two groups: one with texting, using SNS, browsing the Web, playing a video game, and watching TV, and one with reading. In this case; the take-over request method determination unit 5 determines a take-over request method based on the levels of wakefulness, fatigue, nervousness, and concentration (see FIG. 10).

As an example, the take-over request methods database D1 exemplified in FIG. 11 has each driver condition ranked "low", "medium", or "high", and manages take-over request methods corresponding to these three driver condition ranks. Specifically, the take-over request method determination unit 5 ranks each of the estimated levels acquired from the driver conditions detection section 4 "low", "medium", or "high" by comparing the estimated level with two thresholds levels.

In the example depicted in FIG. 11, if the levels of wakefulness, fatigue, nervousness, and concentration are ranked "middle", it indicates that the driver's condition is normal. In this case, the take-over request presentation content selector 53 of the take-over request method determination unit 5 sets the presentation content of the take-over request to be "notify the driver of switch to manual driving". The take-over request presentation device selector 52 selects a display system and a speaker system as presentation devices. Thereby, as shown in FIG. 11, as a take-over request, this notification content is displayed on a certain screen such as the automotive navigation system 61a, and outputted as audio.

Figure 12:
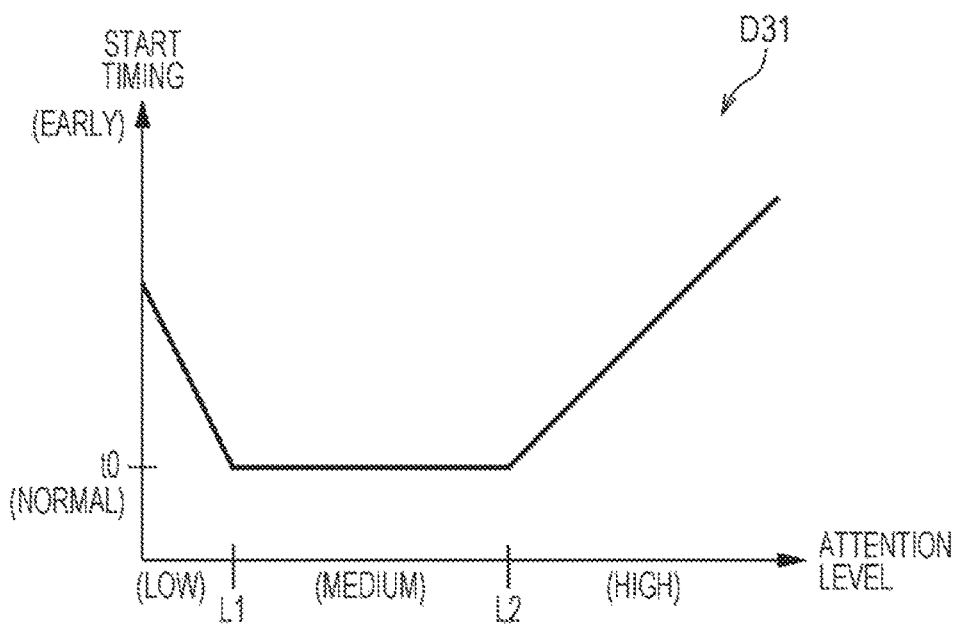
FIG. 12 is a graph illustrating the relation between the level of concentration and the timing to start presenting a take-over request.
Figure 13:
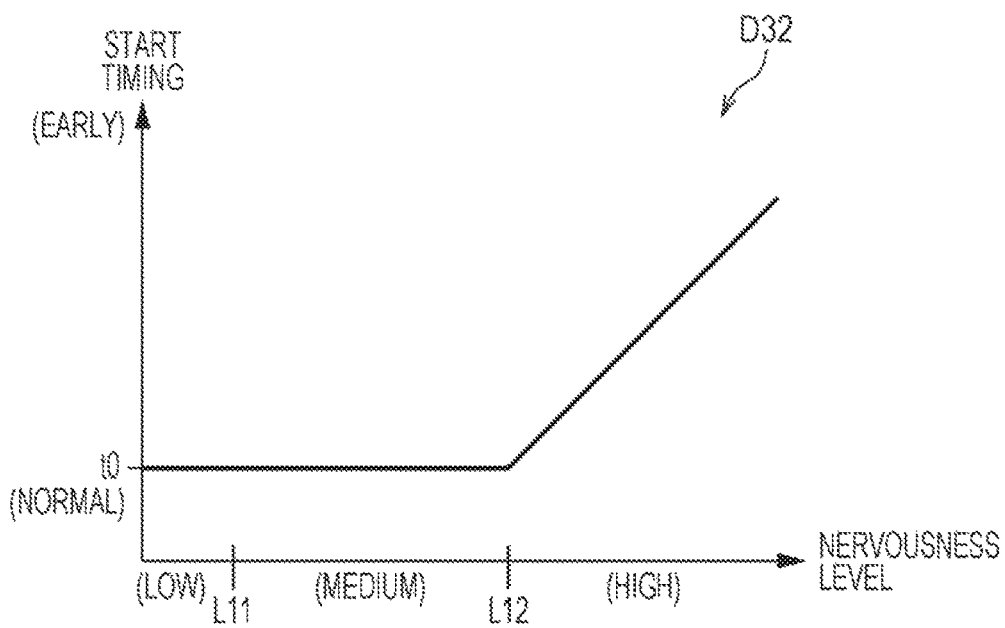
FIG. 13 is a graph illustrating the relation between the level of nervousness and the timing to start presenting a take-over request.

In this case, the take-over request start timing calculator 51 calculates the timing to start presenting a take-over request for the driver in a normal condition, the timing being a time point which is a predetermined takeover period ahead of the estimated time at which the driving mode switches to manual driving. For example, the takeover period is estimated for each activity as a period of time necessary for the driver to return to manual driving. With reference to FIGS. 12 and 13, a description is given of how the take-over request start timing calculator 51 calculates the timing to start presenting a take-over request.

The graph in FIG. 12 depicts the relation between the level of concentration and the timing to start presenting a take-over request in a case where the levels of wakefulness, fatigue, and nervous are ranked "medium". L1 and L2 are threshold levels used in determining the rank of the level of concentration ("low", "medium", or "high"). In the graph, t0 indicates the timing to start presenting a take-over request to be used if the driver is in the normal condition. The graph in FIG. 13 shows the relation between the level of nervousness and the timing to start presenting a take-over request in a case where the levels of wakefulness, fatigue, and concentration are ranked "medium". L11 and L12 are threshold levels used in determining the rank of the level of nervousness out of the three ranks.

The storage 55 of the take-over request method determination unit 5 has stored therein information D31 in FIG. 12 and information D32 in FIG. 13 for each of the ranks of driver condition levels: "low", "medium", and "high".

When the levels of wakefulness, fatigue, and nervousness are ranked "medium", the take-over request start timing calculator 51 refers to the information D31, like the graph in FIG. 12, and calculates the start timing suitable for the estimated level of concentration detected by the driver conditions detection section 4. Thus, when the level of concentration is ranked "high", the higher the level of concentration, the earlier the start timing is than the normal timing t0. Consequently, the more the driver is concentrated on their current activity, such as playing a video game, the earlier the take-over request is presented, helping the driver to return to manual driving safely.

It is also likely that the driver needs a longer takeover time if they are distracted. Thus, in the example shown in FIG. 12, for the level of concentration ranked "low", the lower the level of concentration, the earlier the timing to start presenting a take-over request.

When the levels of wakefulness, fatigue, and concentration are ranked "medium" and the level of nervousness is ranked "high", the take-over request start timing calculator 51 refers to the information D32, like the graph in FIG. 13, and calculates the start timing suitable for the estimated level of nervousness. Consequently, the more nervous the driver is, the earlier the take-over request is presented, helping the driver to return to manual driving safely.

Referring back to FIG. 11, when the wakefulness level is ranked "medium to high", the fatigue level "low to high", the nervousness level "middle to high", and the concentration level "high", the take-over request presentation content selector 53 sets the presentation content of the take-over request to "give a warning prompting the driver to stop the activity". The take-over request presentation device selector 52 determines how to present the take-over request having the warning content, such as displaying the notice on a particular screen of a display system and outputting warning audio from a speaker system, as shown in FIG. 11. To warn the driver more effectively, the take-over request presentation device selector 52 determines to vibrate the seat to shake the body of the driver using an actuator system as a presentation device.

If the driver is concentrated on an activity such as texting, using SNS, browsing the web, playing a video game, or watching TV, it is likely that the driver's eyes are fixed on the screen that the driver is watching. In view of this, based on the activity by the driver detected, the take-over request presentation device selector 52 selects the device whose screen is being watched by the driver (e.g., the smartphone used for texting or the in-vehicle TV used for watching TV) as a display system used as the presentation device, as shown in FIG. 11. If the activity in which the driver is engaging is reading, the screen of the automotive navigation system 61a is selected as a display system used as the presentation device in this embodiment, as shown in FIG. 11.

When the wakefulness level is ranked "low", the fatigue level "low to high", the nervousness level "low to medium", and the concentration level "low", the take-over request presentation content selector 53 sets the presentation content of the take-over request to "give a warning prompting the driver to wake up". The take-over request presentation device selector 52 determines how to present the take-over request having such a content, such as displaying the notice on a particular screen of a display system, outputting warning audio or an alarm from a speaker system, vibrating the seat using an actuator system, and/or ejecting cold air from the air conditioner, as shown in FIG. 11. In the above case, the take-over request start timing calculator 51 calculates the start timing for the take-over request based for example on the estimated level of wakefulness, so that the take-over request will be presented earlier than the normal timing.

3. Advantageous Effects

As described above, the driving assistance apparatus 1 according to this embodiment assists a transition from the autonomous driving mode in which the vehicle is driven under autonomous control to the manual driving mode in which the vehicle is driven by the driver. The driving assistance apparatus 1 includes the activity detection section 3, the driver conditions detection section 4, and the take-over request method determination unit 5. The activity detection section 3 detects an activity in which the driver is engaging while the vehicle is driving in the autonomous driving mode. The driver conditions detection section 4 detects a plurality of conditions of the driver while the vehicle is driving. The take-over request method determination unit 5 determines how to present a take-over request in the vehicle to inform the driver that the autonomous driving mode is going to be cancelled. Specifically, before the autonomous driving mode is cancelled, the take-over request method determination unit 5 sets a take-over request method, which is a method of presenting a take-over request, in the presentation controller 6 based on the driver's activity detected by the activity detection section 3 and on the driver's conditions detected by the driver conditions detection section 4.

This driving assistance apparatus 1 sets the take-over request method based on an activity by the driver and conditions of the driver performing that activity. This helps the driver return to manual driving in a transition from the autonomous driving mode to the manual driving mode.

For example, the device to use for the presentation and the timing to start the presentation can be changed appropriately depending not only on the driver's activity, but also on the physiological and psychological conditions of the driver engaging in that activity. For instance, when the driver is extremely concentrated on an activity such as playing a video game, it is likely that it will take a longer time for the driver to be completely ready for manual driving, than for the driver not concentrated on the activity. With this taken into consideration, the driving assistance apparatus 1 is configured to be able to change the timing to present the take-over request according to the driver's level of concentration on playing the video game, which is detected by the driver conditions detection section 4, and therefore allows the driver to be completely ready for manual driving.

In this embodiment, the take-over request method determination unit 5 (the take-over request method selection section 50) changes the take-over request method based on the detection result of a certain condition of the driver engaging in the detected activity (e.g., when the level of concentration is high), and sets the thus-changed take-over request method in the presentation controller 6. This enables the driver engaging in a driving-unrelated activity to return to manual driving safely and smoothly.

In this embodiment, the driver conditions detection section 4 detects the levels of a plurality of measures indicative of conditions of the driver. The take-over request method determination unit 5 sets the take-over request method based on the detected levels of a certain combination of measures among the plurality of measures which is suitable for the driver's detected activity (see FIG. 10). In this way, a take-over request method is appropriately set based on the levels of measures, which are one of various combinations of measures which is suitable for the activity in which the driver is engaging.

In addition, in this embodiment, the plurality of conditions include a psychological condition indicated by the level of concentration of the driver. This enables the take-over request method to be set with the driver's level of concentration taken into account.

In this embodiment, the driver conditions detection section 4 detects the level of concentration of the driver. When the driver's activity detected is a particular activity, the take-over request method determination unit 5 sets the take-over request method so that the presentation content of the take-over request may be highlighted according to the detected level of concentration. This way, the presentation content of the take-over request is highlighted more when the driver's level of concentration on the particular activity is higher. This helps the driver to return to manual driving.

In this embodiment, the take-over request method determination unit 5 sets the take-over request method so that the timing to start presenting the take-over request will be advanced according to the detected level of concentration. This way, the presentation of the take-over request starts earlier when the driver is over-concentrated on a particular activity. This helps the driver to return to manual driving even more.

In this embodiment, the plurality of conditions include a physiological condition of the driver. Thus, the take-over request method can be set with a physiological condition of the driver, such as drowsiness, taken into account.

In this embodiment, the setting the take-over request method includes setting at least one of the timing to start presenting the take-over request, the content presented in the take-over request, and the device to use to present the take-over request. This way, the take-over request method can be set from various perspectives.

In this embodiment, the driving assistance apparatus 1 further includes the first sensor group 2 and the vehicle-mounted devices IF 20 as a sensor unit to sense information on the driver while the vehicle is driving. The activity detection section 3 detects the activity by the driver based on the sensed information. The driver conditions detection section 4 detects the plurality of conditions based on the sensed information. Such monitoring of the driver using the sensor unit enables accurate detection of the driver's activity and conditions.

In this embodiment, the sensor unit of the driving assistance apparatus 1 includes at least one of the in-vehicle camera 21 that captures an image of the inside of the vehicle, the microphone 22 that picks up voice in the vehicle, the vehicle-mounted devices IF 20 that receives information from devices in the vehicle, the heartbeat sensor 25, the blood pressure sensor 24, and the body movement sensor 23. These various sensor devices allow monitoring of the driver.

The sensor unit of the driving assistance apparatus 1 may include any combination of the above sensor devices, or other sensor devices such as a perspiration sensor. The activity detection section 3 and the driver conditions detection section 4 may detect the driver's activity and conditions using information sensed by any device included in the sensor unit.

In this embodiment, the driving assistance apparatus 1 further includes the driving information acquisition part 81 and the autonomous driving continuance determination part 83. The driving information acquisition part 81 acquires driving information, which indicates driving conditions of the vehicle. Based on the driving information, the autonomous driving continuance determination part 83 determines, in the autonomous driving mode, whether the autonomous driving mode will be continuable for a predetermined period of time or longer. When the autonomous driving continuance determination part 83 determines that the autonomous driving mode will not be continuable for the predetermined period of time or longer, the take-over request method determination unit 5 sets the take-over request method. This way, when it is determined based on the driving information that the autonomous driving mode will not be continuable for the predetermined period of time or longer, the take-over request method can be set ahead of time before the autonomous driving mode is actually cancelled.

In this embodiment, the driving information includes information on the vehicle speed, information on the vehicle position, and surrounding environment information, which indicates the environment surrounding the vehicle. The take-over request method determination unit 5 can thus determine the continuance of the autonomous driving mode based on various pieces of information.

In this embodiment, the surrounding environment information includes information on the situation of any other vehicle around the vehicle, which allows the determination on the continuance of the autonomous driving mode to be made according to the situation of the surrounding vehicles.

In this embodiment, the vehicle is equipped with the camera 71 that captures an image of the outside of the vehicle. The driving information acquisition part 81 acquires surrounding environment information from the camera 71, which allows the determination on the continuance of the autonomous driving mode to be made according to any other vehicle in the images captured by the camera 71.

In a driving assistance method according to this embodiment, the driving assistance apparatus 1 assists a transition from the autonomous driving mode in which the vehicle is driven under autonomous control to the manual driving mode in which the vehicle is driven by the driver. The method includes detecting, by the driving assistance apparatus 1, an activity in which the driver is engaging while the vehicle is driving. The method includes detecting, by the driving assistance apparatus 1, a plurality of conditions of the driver while the vehicle is driving. The method includes determining, by the driving assistance apparatus 1, a take-over request method, which is a method of presenting information in the vehicle to inform the driver that the autonomous driving mode is going to be canceled. The determining a take-over request method includes setting the take-over request method based on the detected activity and conditions of the driver before the autonomous driving mode is cancelled.

This driving assistance method helps the driver return to manual driving in a transition from the autonomous driving mode to the manual driving mode.

Other Embodiments

The comprehensive or specific aspects described above may be implemented as one or any combination of a system, a method, an integrated circuit, a computer program, or a computer-readable recording medium, such as a CD-ROM.

The present disclosure includes the various methods described above. In one aspect of the present disclosure, these methods may be a computer program executed by a computer, or digital signals forming the computer program.

In one aspect of the present disclosure, the computer programs or the digital signals may be recorded in a computer-readable recording medium, such as a flexible disk, a hard disk, a CD-ROM, an MO, a DVD, a DVD-ROM, a DVD-RAM, a Blu-ray Disc (BD, registered trademark), a USB memory device, a memory card, such as an SD card, or a semiconductor memory. An aspect of the present disclosure may be the digital signals recorded in any of these recording media.

In one aspect of the present disclosure, the computer program or the digital signals may be transmitted using a telecommunications line, a wireless or wired communications line, a network such as the Internet, data broadcasting, or the like.

One aspect of the present disclosure may be a computer system including a microprocessor and a memory, the memory having the computer program stored therein, the microprocessor being operated according to the computer program.

The above-described apparatus may be implemented by an independent computer system by transfer of the program or the digital signals recorded in the recording medium or by transfer of the program or the digital signals over the network.

The numerical values used in the above description have been provided to give a specific illustration of the present disclosure, and the present disclosure is not limited to such numerical values given for illustrative purposes.

The functional blocks in the block diagrams are just an example in terms of how they are divided. Two or more functional blocks may be implemented as one functional block, or one functional block may be divided into two or more functional blocks. One or more functions of a certain functional block may be implemented by another functional block. Similar functions of different functional blocks may be processed in parallel or by time division by single hardware or software.

The order in which the steps of the driving assistance method are executed has been specified to provide a specific illustration of the present disclosure. The steps may be executed in any other order. In addition, one of the steps may be executed at the same time as (in parallel with) another step.

The driving assistance apparatus according to one or more aspects has been described above based on the embodiment, but the present disclosure is not limited to the embodiment. The one or more aspects also include various modifications of the embodiment that may be conceived of by those skilled in the art and modes formed in combination with a constituent of a different embodiment, as long as such modifications or modes do not depart from the gist of the present disclosure.

The driving assistance apparatus and the driving assistance method according to the present disclosure are applicable to an autonomous driving system that automates driving of the vehicle.

What is claimed is:

1. A driving assistance apparatus that assists a transition from an autonomous driving mode in which a vehicle is driven under autonomous control to a manual driving mode in which the vehicle is driven by a driver, comprising:
one or more memories; and
circuitry that, in operation, performs operations including
detecting an activity by the driver,
detecting a plurality of conditions of the driver, that include a level of concentration of the driver, and
determining a take-over request method which is a method of presenting, in the vehicle, a take-over request that informs the driver that the autonomous driving mode is going to be cancelled, the determining being based on at least the detected activity by the driver and the plurality of detected conditions, wherein
the determining includes, if the detected activity by the driver is a specific activity, determining the take-over request method so that the take-over request is highlighted depending on the detected level of concentration.

2. The driving assistance apparatus according to claim 1, wherein
the determining includes determining the take-over request method so that timing to start presenting the take-over request is advanced depending on the detected level of concentration.

3. The driving assistance apparatus according to claim 1, wherein
the plurality of conditions include a physiological condition of the driver.

4. The driving assistance apparatus according to claim 1, wherein
the determining includes determining at least one of timing to start presenting the take-over request, content to present in the take-over request, and a device to use to present the take-over request.

5. The driving assistance apparatus according to claim 1, further comprising:
a sensor that senses information on the driver in the moving vehicle, wherein
the detecting an activity by the driver includes detecting the activity by the driver based on the sensed information, and
the detecting a plurality of the conditions includes detecting the plurality of conditions based on the sensed information.

6. The driving assistance apparatus according to claim 5, wherein
the sensor includes at least one of a first camera that captures an image of an inside of the vehicle, a microphone that picks up sound in the vehicle, a vehicle-mounted device interface that receives information from a device mounted in the vehicle, a heartbeat sensor, a blood pressure sensor, and a body movement sensor.

7. The driving assistance apparatus according to claim 1, wherein
the operations further include
acquiring driving information indicating driving conditions of the vehicle, and
during the autonomous driving mode, determining based on the driving information whether the autonomous driving mode is continuable for a predetermined period of time or longer, and
the determining includes determining the take-over request method when it is determined that the autonomous driving mode is not continuable for the predetermined period of time or longer.

8. The driving assistance apparatus according to claim 7, wherein
the driving information includes information on the vehicle speed, information on the vehicle position, and surrounding environment information indicating an environment around the vehicle.

9. A driving assistance apparatus that assists a transition from an autonomous driving mode in which a vehicle is driven under autonomous control to a manual driving mode in which the vehicle is driven by a driver, comprising:
one or more memories; and
circuitry that, in operation, performs operations including
acquiring driving information indicating driving conditions of the vehicle,
detecting an activity by the driver,
detecting a plurality of conditions of the driver,
during the autonomous driving mode, determining, based on the driving information, whether the autonomous driving mode is continuable for a predetermined period of time or longer, and
when it is determined that the autonomous driving mode is not continuable for the predetermined period of time or longer, determining, based on at least the detected activity and the detected conditions, a method of presenting a take-over request that informs the driver that the autonomous driving mode is going to be cancelled, wherein
the driving information includes information on the vehicle speed, information on the vehicle position, and surrounding environment information indicating an environment around the vehicle, and
the surrounding environment information includes information indicating a situation of any other vehicle existing around the vehicle.

10. A driving assistance apparatus that assists a transition from an autonomous driving mode in which a vehicle is driven under autonomous control to a manual driving mode in which the vehicle is driven by a driver, comprising:
one or more memories; and
circuitry that, in operation, performs operations including
acquiring driving information indicating driving conditions of the vehicle,
detecting an activity by the driver,
detecting a plurality of conditions of the driver,
during the autonomous driving mode, determining, based on the driving information, whether the autonomous driving mode is continuable for a predetermined period of time or longer, and
when it is determined that the autonomous driving mode is not continuable for the predetermined period of time or longer, determining, based on at least the detected activity and the detected conditions, a method of presenting a take-over request that informs the driver that the autonomous driving mode is going to be cancelled,
wherein
the driving information includes information on the vehicle speed, information on the vehicle position, and surrounding environment information indicating an environment around the vehicle, and
the surrounding environment information is acquired from an image of an outside of the vehicle, the image having been captured by a camera mounted on the vehicle.

11. The driving assistance apparatus according to claim 9, wherein the plurality of conditions include a physiological condition of the driver.

12. The driving assistance apparatus according to claim 9, wherein the plurality of conditions include a psychological condition of the driver.

13. The driving assistance apparatus according to claim 10, wherein the plurality of conditions include a physiological condition of the driver.

14. The driving assistance apparatus according to claim 10, wherein the plurality of conditions include a psychological condition of the driver.

* * * * *